United States Patent
Lu et al.

(10) Patent No.: US 12,234,007 B2
(45) Date of Patent: Feb. 25, 2025

(54) SYSTEM AND METHODS FOR DESIGNING AND BUILDING REGIONAL HYBRID-TO-ELECTRIC SYSTEMS AND METHODS FOR DESIGNING AND OPTIMIZING REGIONAL HYBRID-TO-ELECTRIC AIRCRAFT

(71) Applicant: Zunum Aero, Inc., Redmond, WA (US)

(72) Inventors: Jimmy Lu, N. Markham (CA);
Mathew Isler, Sammamish, WA (US);
Matt Knapp, Redmond, WA (US);
Kevin Holcomb, Sultan, WA (US);
Petek Saracoglu, Langley, WA (US);
Lauren Burns, Templestowe (AU);
Herb West, Bothell, WA (US)

(73) Assignee: Zunum Aero, Inc., Redmond, WA (US)

( * ) Notice: Subject to any disclaimer, the term of this patent is extended or adjusted under 35 U.S.C. 154(b) by 0 days.

(21) Appl. No.: 18/174,567

(22) Filed: Feb. 24, 2023

(65) Prior Publication Data
US 2023/0286646 A1    Sep. 14, 2023

Related U.S. Application Data

(63) Continuation of application No. 16/696,671, filed on Nov. 26, 2019, now Pat. No. 11,591,074.
(Continued)

(51) Int. Cl.
*B64C 13/50* (2006.01)

(52) U.S. Cl.
CPC .................. *B64C 13/507* (2018.01)

(58) Field of Classification Search
CPC ...... B64C 13/507; B64D 33/00; B64D 47/00; B64D 11/00; B60P 1/02
See application file for complete search history.

(56) References Cited

U.S. PATENT DOCUMENTS 2,735,391 A * 2/1956 Buschers .................. B64F 1/04
                                                    89/1.819
3,993,207 A * 11/1976 Jones ...................... B60P 1/025
                                                    180/21
(Continued)

FOREIGN PATENT DOCUMENTS

EP      2583896 A1    4/2013

OTHER PUBLICATIONS

Office Action, U.S. Appl. No. 16/696,671, Mailed May 26, 2021, 6 pages.
(Continued)

*Primary Examiner* — Assres H Woldemaryam
(74) *Attorney, Agent, or Firm* — Berkeley Law & Technology Group, LLP

(57) ABSTRACT

This document details a series of inventions relating to the design and optimization of hybrid-to-electric aircraft. In particular, a system and method is presented to improve the effectiveness of mixed aerodynamic control surfaces which are actuated by a novel electromechanical actuator which allows the system to be tolerant to actuator faults and jams. In addition, innovations relating to integration and quick swap of large energy storage units such as batteries are disclosed, and further, an algorithm which may be used to optimize numerous aspects of the regional hybrid-to-electric aircraft known as Total Cost Door to Door or TCD2D.

19 Claims, 16 Drawing Sheets

Related U.S. Application Data

(60) Provisional application No. 62/772,455, filed on Nov. 28, 2018.

(56) References Cited

U.S. PATENT DOCUMENTS

| | | | | |
|---|---|---|---|---|
| 4,444,087 | A * | 4/1984 | Hunter | F41F 3/077 89/1.819 |
| 4,759,515 | A | 7/1988 | Carl | |
| 5,791,596 | A | 8/1998 | Gautier et al. | |
| 6,007,023 | A * | 12/1999 | Lehman | B64F 1/12 244/63 |
| 6,206,329 | B1 | 3/2001 | Gautier et al. | |
| 6,422,511 | B1 * | 7/2002 | Kalisz | B64F 5/60 244/114 R |
| 6,805,321 | B2 * | 10/2004 | Rodier | B64F 1/12 244/116 |
| 6,905,095 | B1 * | 6/2005 | Gruzdeva | B64F 1/322 414/495 |
| 6,948,682 | B1 | 9/2005 | Stephenson et al. | |
| 7,819,363 | B2 * | 10/2010 | Johnson | B65G 69/24 244/137.1 |
| 8,511,613 | B2 * | 8/2013 | Droney | B64D 27/24 244/62 |
| 9,845,158 | B2 * | 12/2017 | Liske | B64D 27/24 |
| 9,908,616 | B1 | 3/2018 | Horn et al. | |
| 9,923,252 | B2 * | 3/2018 | Nubbe | H01M 10/613 |
| 10,994,865 | B2 * | 5/2021 | Daw Perez | B64D 9/00 |
| 2003/0191561 | A1 | 10/2003 | Vos | |
| 2004/0115034 | A1 * | 6/2004 | Arijoki | B64F 1/322 414/495 |
| 2008/0234881 | A1 | 9/2008 | Cherepinsky et al. | |
| 2009/0187292 | A1 | 7/2009 | Hreha et al. | |
| 2010/0023186 | A1 | 1/2010 | Sahasrabudhe et al. | |
| 2010/0065691 | A1 * | 3/2010 | Droney | B64D 27/24 244/65 |
| 2010/0320314 | A1 | 12/2010 | Balaskovic | |
| 2011/0066305 | A1 | 3/2011 | Lin et al. | |
| 2012/0072056 | A1 | 3/2012 | Hasan et al. | |
| 2014/0163857 | A1 * | 6/2014 | Melum | G08G 5/0013 701/300 |
| 2014/0242424 | A1 * | 8/2014 | Jones | H01M 10/625 429/61 |
| 2016/0207617 | A1 * | 7/2016 | Sada-Salinas | B64C 27/025 |
| 2016/0236790 | A1 * | 8/2016 | Knapp | G08G 5/0034 |
| 2017/0001610 | A1 * | 1/2017 | Singh | B64C 25/44 |
| 2018/0089622 | A1 * | 3/2018 | Burch, V | B64U 50/19 |
| 2018/0327090 | A1 * | 11/2018 | De Chassey | B64C 39/024 |
| 2019/0061907 | A1 * | 2/2019 | Corrao | B64C 30/00 |
| 2020/0122835 | A1 * | 4/2020 | Daw Perez | B64C 1/20 |
| 2020/0122858 | A1 * | 4/2020 | Daw Perez | B65G 69/24 |
| 2020/0130863 | A1 * | 4/2020 | Zosel | B64F 1/00 |

OTHER PUBLICATIONS

Response to Office Action, U.S. Appl. No. 16/696,671, filed Nov. 23, 2021, 16 pages.
Final Office Action, U.S. Appl. No. 16/696,671, Mailed Mar. 22, 2022, 23 pages.
RCE/Amendment, U.S. Appl. No. 16/696,671, filed Sep. 22, 2022, 10 pages.
Notice of Allowance, U.S. Appl. No. 16/696,671, Mailed Oct. 26, 2022, 9 pages.
Issue Fee, U.S. Appl. No. 16/696,671, filed Jan. 26, 2023, 3 pages.
Issue Notification, U.S. Appl. No. 16/696,671, Mailed Feb. 8, 2023, 1 page.

* cited by examiner

SYSTEM AND METHODS FOR DESIGNING AND BUILDING REGIONAL HYBRID-TO-ELECTRIC SYSTEMS AND METHODS FOR DESIGNING AND OPTIMIZING REGIONAL HYBRID-TO-ELECTRIC AIRCRAFT

CROSS REFERENCE TO RELATED APPLICATIONS

This application is a continuation of U.S. patent application Ser. No. 16/696,671, titled "SYSTEM AND METHODS FOR DESIGNING AND BUILDING REGIONAL HYBRID-TO-ELECTRIC SYSTEMS AND METHODS FOR DESIGNING AND OPTIMIZING REGIONAL HYBRID-TO-ELECTRIC AIRCRAFT," filed on Nov. 26, 2019, and is incorporated herein by reference in its entirety, which claims the benefit of priority to U.S. Provisional Patent Application No. 62/772,455 entitled "Hybrid-to-Electric Aircraft," filed on Nov. 28, 2018, the entire disclosure of which is incorporated herein by reference.

BACKGROUND

Transportation systems and transport platforms are an important part of the infrastructure used to enable commerce and the movement of people between locations. As such, they are essential services for the growth of an economy and the development of a society. Over the years, several types of transportation systems have been developed, each typically with their own focus, advantages and drawbacks.

A key challenge for transportation is the developing "gap" over regional distances, where much of the world is left without a high-speed mode. Competitive pressures have driven a 70-year decline of air over these distances. And the impact of high-speed rail is limited by economics to a few dense corridors. As a result, the last time the US travel survey was conducted in 2001, 90 percent of all long-distance trips were over regional distances from 50 to 500 miles. Yet just 2 percent of these were by air, with auto at a staggering 97 percent. This has had a tremendous impact on mobility and economic development. Regional door-to-door mobility has stagnated: travel times by highway have not improved for decades; and flight times have stretched given slower cruise speeds and increasingly congested airports. Meanwhile, the steady consolidation of air services to a declining set of major hubs has left many communities disconnected from the global air network, with severe impact on their economy and ability to attract investment.

This bleak landscape is poised for dramatic change as sharing, electrification and autonomy converge to enable fast and flexible regional transport at scale. Intra-urban travel is already being reshaped by ridesharing, car sharing, car and van pooling. Electric vehicles and driverless technologies will take this further. Lower fares, improved productivity and reduced congestion will dramatically expand utility and extend range. Crucially, as recognized by the inventors, the transformation on the ground will take to the skies, extending impact of this "new transport" to regional, and eventually, intracontinental ranges. A new breed of small- to mid-sized hybrid-electric aircraft will usher in a golden era of regional air. Frequent departures of smaller aircraft from a large number of smaller airfields will enable air travel much faster than today and at much lower fares. Over time, rapidly improving batteries will further reduce costs and extend range, while increasing acceptance of drones will gradually reduce the need for pilots onboard, accelerating the trend.

As recognized by the inventors, this scale-out of air transport via small to mid-sized aircraft flying regional ranges is a direct result of the unique operating economics of range-optimized hybrid-electric aircraft, enhanced further by future autonomy. Conventional aircraft are enormously scale and range advantaged. Larger aircraft are more efficient, as are flights over longer ranges, than smaller aircraft or shorter flights. These economies of scale and range have powered the long-term transition of aviation to large, long-haul aircraft and high-volume hubs, destroying the utility of regional air. In contrast, hybrid-electric aircraft are free of the scale and range economics that plague regional aviation today. Smaller electric aircraft fly as efficiently as larger ones. And relatively small electrics flying regional are competitive with the largest conventional jets flying long-haul. Released from the constraints of scale and range, operators will mold aircraft, frequency and routes to travel patterns. The air network that emerges will be distributed, with frequent flights to a large number of community and urban airports, a contrast to the concentrated network of today.

As recognized by the inventors, in addition to the actual electric propulsion units, there are a number of innovative enabling technologies that can improve or facilitate hybrid-to-electric and fully electric aircraft, a plurality of which are disclosed in this patent. These technologies include systems and methods to implement a fly-by-wire control system wherein some or all actuators are electromechanical. In addition to flight control algorithms and actuation, systems and methods are disclosed for efficiently integrating energy storage units such as batteries in a way which enables said units to be quickly removed and replaced. This quick-swap process can improve the commercial viability of electric flight while batteries require more time to charge fully than the typical turn around (e.g., 10-15 minutes) made by regional operators. Additional innovations are also disclosed herein regarding a full flight optimization metric which provides a single objective function against the complex process of range optimizing regional hybrid electric aircraft and allowing conventional optimization tools to be applied to the design problem.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Briefly, one implementation concerns electrically actuated flight controls compatible with fly-wire systems capable of piloted, remotely piloted, or even autonomous flight. As recognized by the inventors, the current state of the art in electromechanical actuators has failure modes including jams, and runaway, which significantly complicate implementation as a primary flight control actuator. A system and method is disclosed in which a single level of redundancy in control, sensing and actuation, coupled with a minimal logical loop, provides prompt diagnosis of failures enabling corrective action for safe continuation of flight. In this example failures include, but are not limited to mechanical jams, control system or sensing failures, and actuator drive motor runaway (uncommanded actuation). An exemplary embodiment of a dual motor, geared, clutched electromechanical actuator is also disclosed herein.

A second embodiment concerns a flight control algorithm in a fly-by-wire control system which increases the effectiveness of aerodynamic controls relating to a configuration in which inputs from multiple control inceptors are mixed prior to commanding the actuators. This type of control inceptor mixing is commonly seen on a "V-Tail" configuration where pitch and yaw inceptor commands are mixed to a net command to the V-Tail control surface actuators such that inceptor inputs may compliment or compete in the final command to the surface actuator or actuators.

In this embodiment a system and method are described to actively determine the available control authority remaining in either axis, a value which is continuously changing based on the inputs of both control inceptors, and further to provide a signal to the pilot or other outer-loop control on reaching the limits of control authority in any one axis (e.g. a "soft stop" in the control feel). The pilot, on reaching the soft stop, for example a sharp gradient in stick force, understands that commanding additional pitch control will come at expense of the directional control and can decide whether or not to invoke the biased mixing by moving through the haptic barrier. When included as part of the overall control system design, this selective biased mixing enables more control authority from a smaller control surface, resulting in a more efficient system.

In a further embodiment, a number of solutions are disclosed relating to the electric aircraft challenge of having large stored energy units which can be quickly removed from the aircraft when depleted, and replaced with a fully charged energy storage unit. The methods disclosed include design of the energy storage units, containing pods, integration with an aircraft, necessary provisions for quick swap, and implementation of the quick swap process with ground support equipment.

In another embodiment, a design method is disclosed to integrate a gas turbine designed for propulsion turbine in an aft fuselage location to be used for power generation.

And in another embodiment, a system and method is presented on an optimization objective function ideally suited for regional aircraft, and in particular, hybrid and hybrid-electric aircraft. This system and method is disclosed in detail in, U.S. Provisional application 62/772,455, the entire disclosure of which is hereby incorporated by reference.

It should be understood that the aforementioned embodiments are merely example implementations, and that claimed subject matter is not necessarily limited to any particular aspect of these example implementations

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way

FIG. 17a is a diagram illustrating the energy storage unit integration on the aircraft while

DETAILED DESCRIPTION

Figure 1:
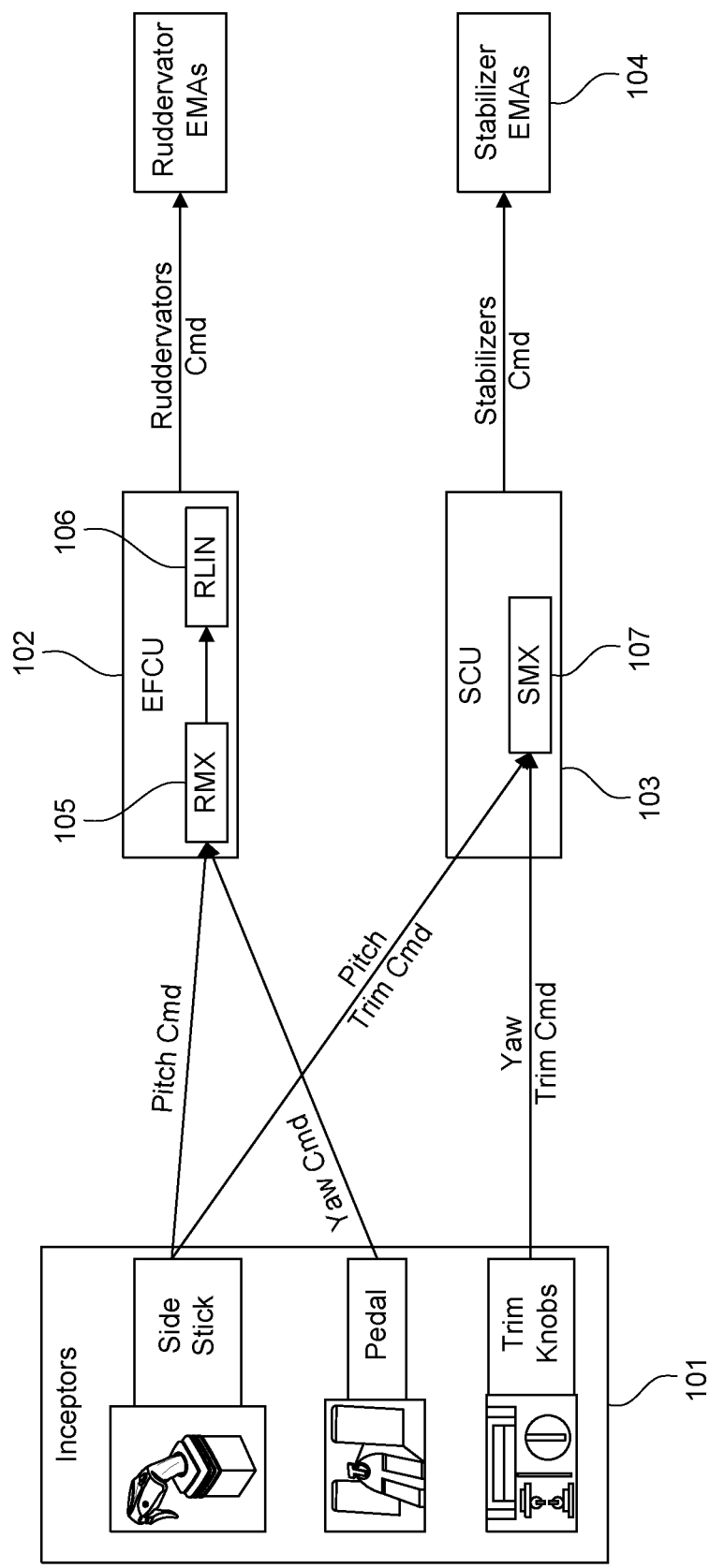
FIG. 1 is a block diagram showing the configuration of control inceptors, Flight control hardware, and actuation hardware in a mixed command inceptor actuation system, according to an embodiment.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art. Further the embodiments may also refer to material which has been previously disclosed in the U.S. Provisional Patent Application No. 62/772,455, the entire disclosure of which is hereby incorporated by reference.

Among other things, the present invention may be embodied in whole or in part as a system, as one or more methods, as one or more elements of an aircraft or transportation system, as one or more elements or functional modules of an aircraft (flight) control system or regional aircraft transportation system control system, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein for use in the flight control (or other form of control) of an aircraft or of a transportation system may be implemented by one or more suitable processing elements (such as a processor, microprocessor, CPU, controller, etc.) that is part of a client device, server, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

According to an embodiment, an aircraft is equipped with fly-by-wire flight control system in which aerodynamic control surfaces are displaced by actuators as commanded by signals from the pilot, autopilot, or other outer-loop control system. The control surface actuators may be hydraulic or electromechanical or any other device capable of mechanically actuating the control surface. In this embodiment, one or more of the control surfaces is used to provide control in more than one axis, for example pitch and yaw, such that control commands for these axes must be combined with a mixing algorithm to determine the surface deflection needed to meet both commanded inputs In particular, in one embodiment, an aircraft is configured with an empennage consisting of two flight surfaces forming a "V-Tail" as depicted by 402 in FIG. 4, and which provides both longitudinal and directional stability and control. The control response of the flight surfaces may be provided by actuating a trailing edge control surface, for example, 401, and 403 in FIG. 4, which in this embodiment are referred to as "ruddervators". In addition in this embodiment, the left and right surfaces in their entirety are mounted to the aircraft in such a way that each surface (402) may be independently actuated to change the angle at which the surface meets the oncoming airflow and thus to function both as longitudinal and directional trim devices. Control response to pilot or autopilot command may be achieved by either motion alone, or any combination of these two movements.

V-Tail configurations can provide a smaller, lighter, lower drag empennage compared with a conventional tail configuration. However, a well known challenge that exists in sizing the V-Tail is that in critical cases where pitch and yaw inputs compete for surface deflection, the limit of the control surface effectiveness may be reached prior to meeting the intended, required, and or designed-for control response. This results in increasing the size of the V-Tail until sufficient control response is reached, and often the larger size eliminates most or all of the weight and drag benefits of the V-Tail.

Embodiments described herein include a way to allow the pilot, or other outer loop control authority, to prioritize one control input over the other at points in the flight path where the summed inputs would otherwise reach the limits of the control response. In this way, the pilot may choose to deliberately limit control response in one axis for a short period of time in order to increase control response in the other axis. When applied to critical sizing conditions for the V-Tail, this invention allows the total area to be reduced.

In one embodiment a pilot controls the aircraft with a stick, side-stick or yoke for pitch control, and rudder pedals for yaw control and the controls are actuated to provide variable force and position feedback to the pilot. In addition, the pilot may enter a constant offset to the control actuators in either axis through use of a "trim" inceptor in the cockpit which may be a switch, trim wheel, or other trim input control. FIG. 1 is a block diagram of an embodiment in which the inceptors 101 provide inputs to the Electronic Flight Control Unit (EFCU), 102, and also the Stabilizer Control Unit (SCU), 103, both of which provide output commands to the Electromechanical Actuators (EMAs), 104 on the V-Tail.

Figure 2A:
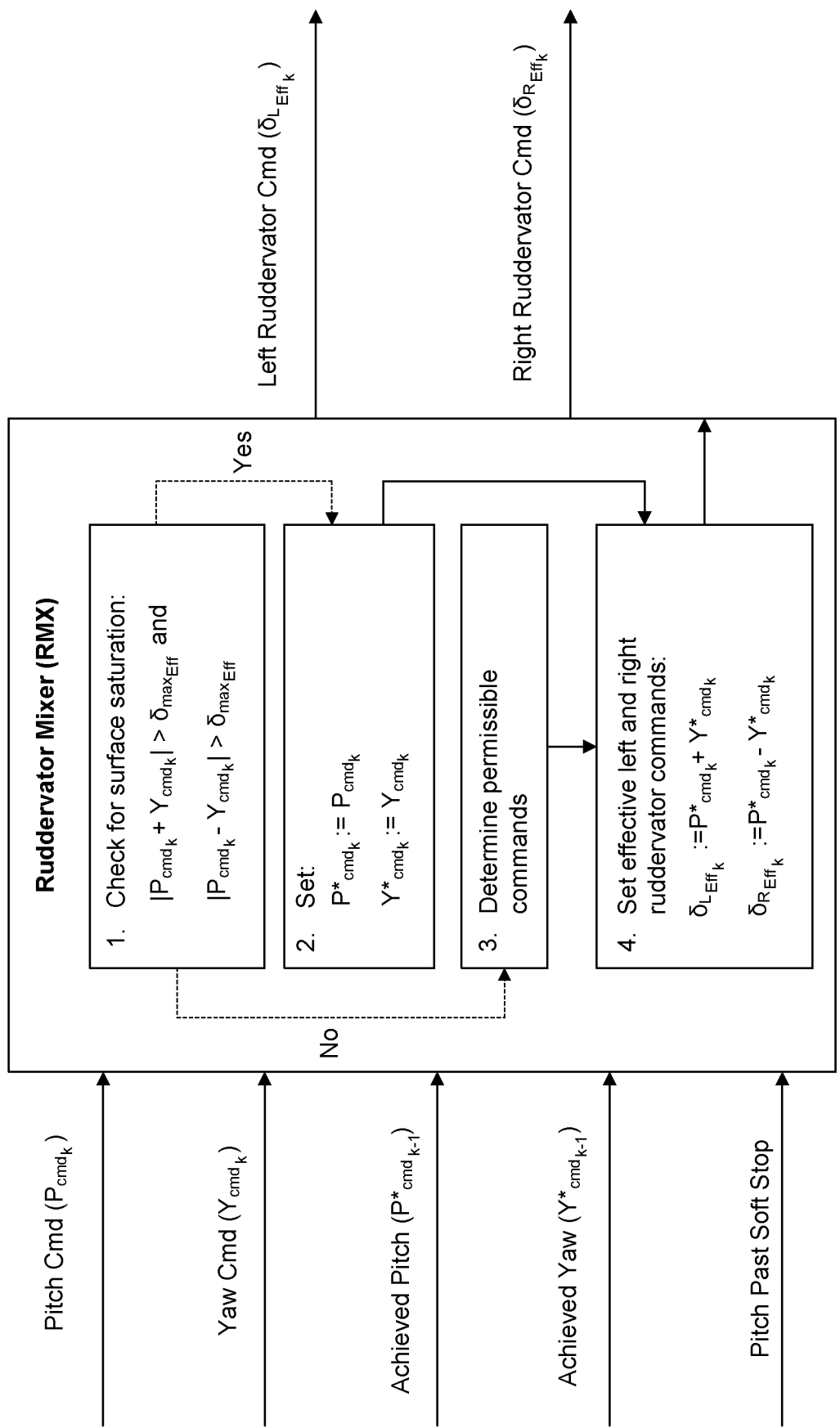
FIGS. 2a and 2b are flowcharts or flow diagrams illustrating a process, method, operation, or function to determine desired control commands in two axes based on input control commands compared with achieved command response, according to embodiments.

The Flight Control System (FCS), which includes the EFCU And SCU, receives inputs from all inceptors and electronically converts the single axis inputs into commands for the V-Tail actuators to produce the expected response. The conversion from inceptor input to actuator signal occurs in the Ruddervator Mixing Function (RMX) 105, and an exemplary implementation of the RMX is depicted in FIG. 2a. The FCS transforms the desired ruddervator commands generated from the RMX function into the surface commands in the Ruddervator Linearization function (RLIN) 106. RLIN achieves proportional aerodynamic responses on both ruddervators via a nonlinear gearing mapping the desired surface command to the actual surface command.

Similarly, the FCS receives trim inputs from the pitch trim and rudder trim, and electronically converts the single axis commands into actuator commands within a Stabilizer Mixing Function (SMX) 107. In some embodiments, trim actuation consists of separate commands to the left and right stabilizer surfaces. If the combined command on either surface exceeds the stabilizer travel range, the mixing function prohibits further pitch or yaw trim command from being added to the stabilizer commands By way of example, a single axis pitch command for "nose up" results in all ruddervators being deflected trailing-edge up, while a single axis yaw command for "nose-left" results in all ruddervators being deflected trailing edge left. In the case in which the pilot commands both pitch, and yaw, the RMX combines the inputs and then deflects the ruddervators with the net command, for example, a nose-up combined with a nose-left command both deflect the right side ruddervator trialing edge up. However, the left side ruddervator pitch command works against the yaw command resulting in a reduction of deflection on the left and increase in deflection on the right to compensate. These examples are provided only for illustration purposes and are one of many possible scenarios in a mixed control system. By way of illustration, in FIG. 4, which is a tail view of the aircraft, 401 depicts a trailing edge left (nose-left yaw) deflection, while 403 depicts a tailing-edge up (nose-up pitch) deflection.

Figure 2B:
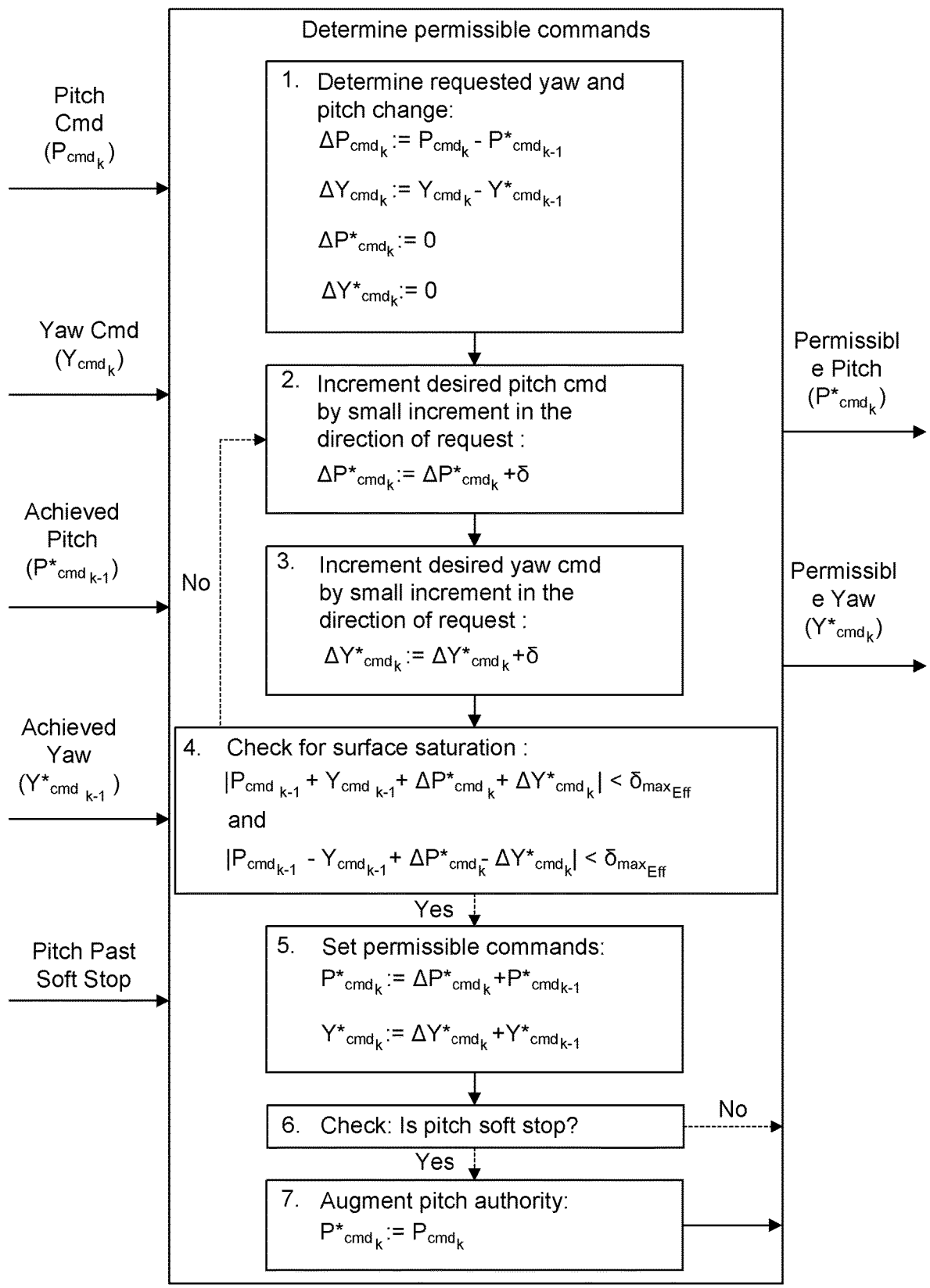

Because commands from two inceptors are combined in the RMX function, it is possible for the function to command displacements in excess of the available maximum of the surface, and further, to produce incorrect responses due to the saturated condition of the surface actuator. In this innovation, an algorithm to is presented to determine a digital limitation equivalent to a mechanical stop, and further, to impose an "Active Inception Barrier" to communicate this variable "soft stop" to the pilot in order to avoid incorrect control responses, while maximizing available control authority is disclosed in the following equations, while FIG. 2b provides an exemplary implementation of the control logic.

a) In the nominal scenario, the effective (pre-linearizing) surface commands are derived via the relationships in (i) and (ii):

$$\delta_{L_{Eff}} = P_{cmd} + Y_{cmd} \qquad \text{i)}$$

$$\delta_{R_{Eff}} = P_{cmd} - Y_{cmd} \qquad \text{ii)}$$

b) If either $|\delta_{L_{Eff}}| > \delta_{max_{Eff}}$ or $|\delta_{R_{Eff}}| > \delta_{max_{Eff}}$, $P_{cmd}$ and $Y_{cmd}$ should be restricted to $P^*_{cmd}$ and $Y^*_{cmd}$ such that relationships in (a) still hold; otherwise, inputting a single axis command would result in both pitch and yaw responses.
  i) A digital algorithm to ensure correct control actuation and response is to advance $\Delta P_{cmd_k} = P_{cmd_k} - P^*_{cmd_{k-1}}$ and $\Delta Y_{cmd_k} = Y_{cmd_k} - Y^*_{cmd_{k-1}}$ at sample time k, where * denotes the achieved commands at the indicated sample time, alternately by equal small amplitude, until the left or right surface is saturated.
  ii) Then $P^*_{cmd_k} = P^*_{cmd_{k-1}} + \Delta P^*_{cmd_k}$ and $Y^*_{cmd_k} = Y^*_{cmd_{k-1}} + \Delta Y^*_{cmd_k}$.

As previously mentioned, the V-Tail design sizing criteria are flight conditions at which the mixed pitch and yaw commands are at the limit of the control authority, and further that these few flight conditions result in the tail and control surface to be sized larger than required for the remaining flight envelope. A system and method is disclosed herein by which the over-sizing conditions may be mitigated via an informed decision of the pilot to briefly alter the mixing algorithm, enhancing control response in one axis at the expense of response in the second axis. In order to provide this capability in a safe, consistent manner which produces the response expected by the pilot, the system must clearly notify the pilot that the controls have reached a saturation threshold, and must further present a modified control feel when operating in the region of biased control inputs. In some embodiments, this pilot interaction is accomplished using haptic feedback and modified response of the actuated control inceptors in a system called the Active Inceptor Barrier (AIB). In other embodiments, the pilot interaction may also take other forms of haptic, audio, and visual notification so long as the required handling quality requirements are met.

Figure 3:
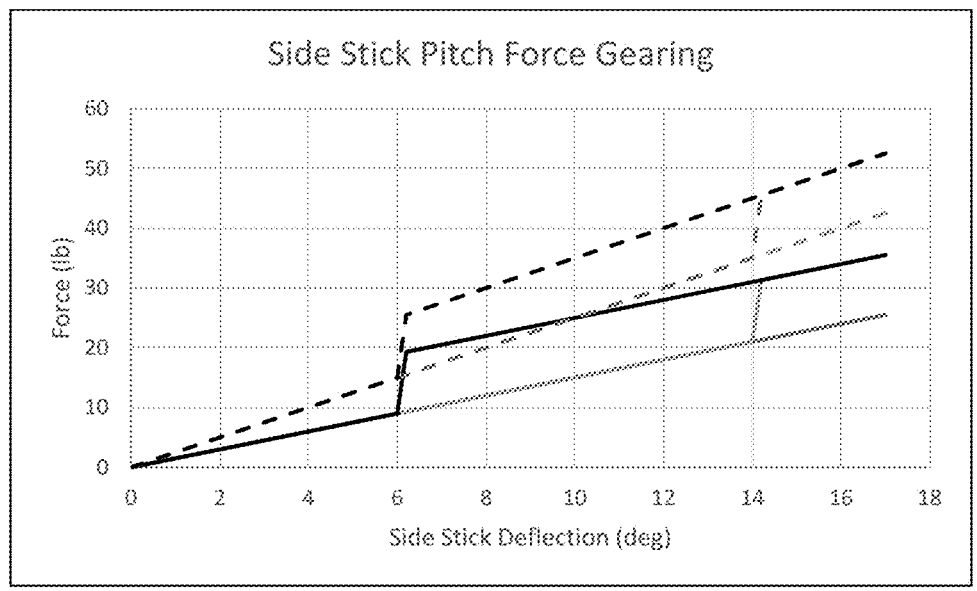
FIG. 3. is a diagram presenting force gradients which may be used as an Active Inceptor Barrier to signal the onset of biased control mixing to the pilot, according to an embodiment.
Figure 3:
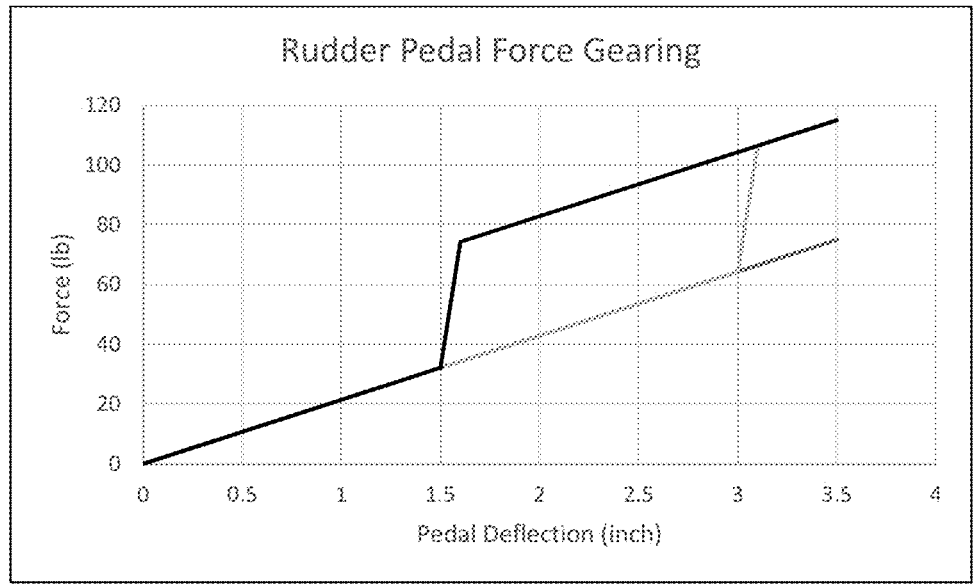

The Active Inceptor Barrier is a system comprised of active pitch and yaw inceptors to provide tactile feedback to the pilot that the RMX has reached the aerodynamic maximum deflection on one of the ruddervator surfaces via a mutable spring gradient barrier, or soft stop, as detailed above. The soft stop is comprised of a much stiffer spring force gradient, with finite force, than that under nominal operation, such that the pilot perceives it as an artificial barrier. The concept of a "soft stop" is not new, however, with single axis, non-mixed controls, the implementation of a soft stop is a simple function based on a fixed position, rate, or response. As recognized by the inventors, this type of logic will not work in a system where control inputs are mixed as the position of the soft stop is now a function of two inceptors, and response of the aircraft in two axes. According to this innovation therefore, the location of the soft stop, for one axis, adjusts according to the remaining authority for that axis, with information provided by the RMX as previously described. An example implementation, but by no means the only implementation for the AIB is shown in FIG. 3 in which:

a) The pitch axis barrier has a gradient of 50 lb/deg and a backlash of 0.2 deg, and
b) The yaw axis barrier has a gradient of 400 lb/inch and a backlash of 0.1 inch.

According to the embodiment, the AIB first serves the function of informing the pilot that the limits to control authority have been reached in that axis and second that any further displacement of the inceptor will compromise the available control authority in the other axis. If the pilot continues to displace the control inceptor, the nominal RMX operation is overridden. By way of example, when a pilot "pulls through" the AIB soft stop on the pitch inceptor, the RMX algorithm is altered for the ruddervator surface which has not reached the maximum limit and this surface is commanded in the same direction as the pitch command, proportional to the inceptor command. This grants higher pitch axis authority at the expense of yaw authority and applies to pitch axis only as detailed in the algorithm herein and further depicted in FIG. 2b:

c) As described above, the RMX digital algorithm is to advance $\Delta P_{cmd_k} = P_{cmd_k} - P^*_{cmd_{k-1}}$ and $\Delta Y_{cmd_k} = Y_{cmd_k} - Y^*_{cma_{k-1}}$ at sample time k alternately by equal small amplitude, until the left or right surface is saturated.
d) Then $P^*_{cmd_k} = P^*_{cmd_{k-1}} + \Delta P^*_{cmd_k}$ and $Y^*_{cmd_k} = Y^*_{cmd_{k-1}} + \Delta Y^*_{cmd_k}$
e) Over-ride then is enabled If $P_{cmd_k} > P^*_{cmd_k}$, set $P^*_{cmd_k} := P_{cmd_k}$ and recompute the left and right surface commands as per relationship shown above.

The algorithms described herein, while provided in context of pitch and yaw control for an aircraft with a V-Tail, are general algorithms which may apply to other systems in which control inceptor inputs are mixed to produce commands for control actuators.

The Thrust Asymmetry Accommodation (TAA) function is an FCS function that commands the V-Tail stabilizers to asymmetrically deflect toward the higher thrust engine in the event of detected thrust asymmetry. While thrust asymmetry protection has been provided through yaw dampers and autopilots commanding the rudder on prior aircraft, this innovation utilizes the ability to independently rotate both of the V-Tail surfaces to provide the TAA response.

The elements of the TAA are:
a) A monitoring function which detects failure in one or more thrust producing engines or propulsors. This monitoring may be accomplished through a threshold difference between commanded and provided thrust output, and may include a time rate of change element to avoid false triggers
b) A control law, or heuristic in which the amount of trim applied to correct for the thrust asymmetry in engine failure is calculated as a function of commanded thrust, actual thrust (all engines), aircraft configuration (landing gear, high lift system or other systems which affect lateral-directional stability)
c) An interface to the FCS to command the trim deflection.

In an exemplary embodiment, the TAA is engaged if thrust asymmetry is detected and the airspeed is below a critical threshold, typically on takeoff and landing. The TAA commands the stabilizers at the maximum design slew rate to a finite command authority. In one embodiment, the engagement latched (locked out) to prevent redeployment of TAA over the rest of the flight.

As is well appreciated by those familiar with the art of aircraft design, every additional system results in higher weight, cost, and complexity on the final aircraft. Conventional aircraft are equipped with spoilers, separate control panels on the upper surface of the wing the primary, and at times, sole function of which are to add drag for faster descents. On conventional aircraft, these are frequently needed due to the high residual thrust of the jet engines. As recognized by the inventors, an aircraft equipped with a V-Tail empennage with at least two trailing edge control surfaces per surface also has the ability to serve as a very precise drag brake with differential, high angle deflections.

Figure 4:
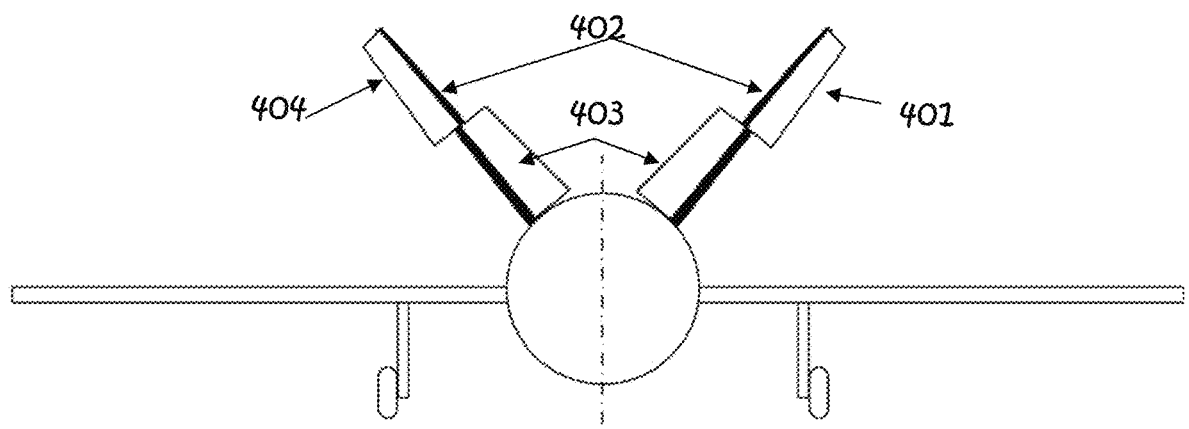
FIG. 4 depicts an example aircraft with a V-tail in which the control surfaces have been deployed to function as a speed brake.

In an embodiment, the fly by wire airplane with a V-tail is configured with split control surfaces which can be deflected asymmetrically on each surface to provide increased drag in flight as depicted in FIG. 4 where 401, with 404 show a very high symmetric output deflection, and 403 shows a high angle inboard deflection. This innovation reduces, and may eliminate the need for standard spoilers on the wing, saving weight, cost, and reducing noise in flight. In one embodiment, the speed brake functionality is accomplished with an additional command set in the FCS and RMX with the inceptor inputs being the traditional pilot controlled speed brake. In another embodiment, split-surface speed brake functionality may also be integrated with automatic features to enhance flight safety, for example automatic deployment for emergency descent following loss of cabin pressure. In another example, the split-surface speed brake may be automatically deployed if the aircraft is on a flight path expected to exceed the maximum allowed airspeed.

One key difference between electric propulsion aircraft and conventional is that all aircraft systems must be electrically powered as there are no combustion engines with accessories such as hydraulic pumps. On conventional aircraft, engine driven hydraulics are the most common means of providing actuation to flight control surfaces, and for safety in a fly-by-wire control system, primary control surfaces are actuated by two independent actuators on two independent hydraulic systems. The performance and failure modes of such actuators and hydraulic systems are well proven and well understood; in particular, loss of hydraulic pressure for any reason results in a non-functioning actuator, but also one which provides very little resistance to movement such that the remaining actuator retains full range of surface motion.

An alternative to the hydraulic actuator, is the Electromechanical Actuator, or EMA. An example electromagnetic actuator includes a drive shaft, a motor operable to rotate the drive shaft, and a load shaft coupled to an armature body. The EMA may also include a clutch which is operable to control whether the drive shaft engages the load shaft. The clutch may be operable by mechanical, or electrical, or other means. In addition to the clutch, the EMA may include a brake to prevent rotation of the shaft when the actuator is not operating.

In both electrical and conventional aircraft there can be significant benefits to replacing the multiple hydraulic systems and actuators with electromechanical actuators (EMAs) including lower weight, lower maintenance requirements and lower failure rates leading to higher levels of safety. However, one of the key challenges to overcome for the EMA is a frozen or "output jam" failure in which the actuator both stops functioning, and also serves as a lock preventing any further movement of the surface. This type of failure mode has significantly adverse effects on controllability, safety and architecture.

Figures 5A, 5B:
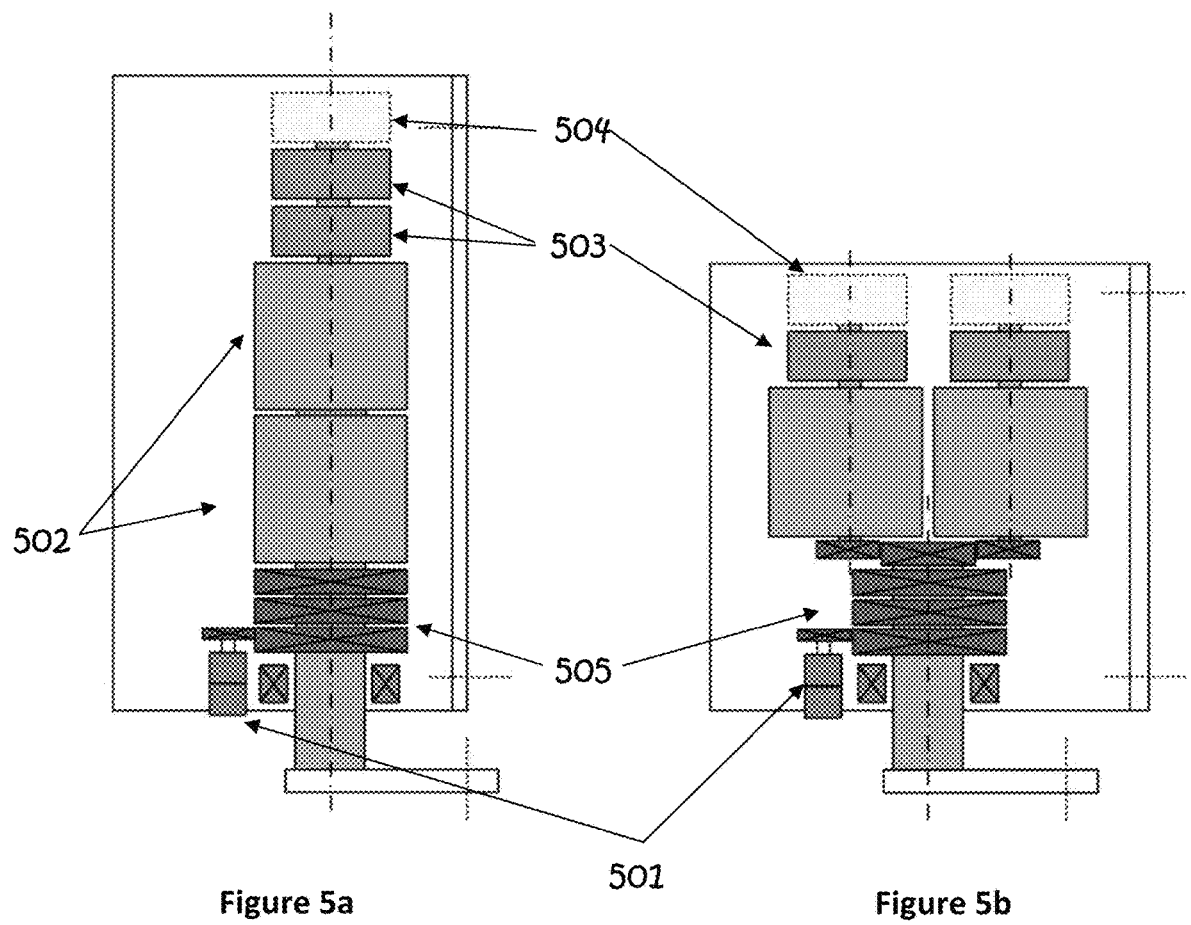
FIGS. 5a and 5b are schematics of two electromagnetic actuators, according to embodiments.

This disclosure pertains to a system and method to implement a fly-by-wire (FBW) flight control system using only EMAs for control surface actuation. The system utilizes mechanical and electrical redundancy, coupled with fault detection and mitigation algorithms to detect and mitigate failures allowing for safe continuation of flight. The flight control system is comprised of the following elements:

One or more actuators attached to each control surface in which a single load shaft is driven by dual, independent servomotors which are commanded by independent control loops. The motors may be located sequentially on a common drive shaft, or in parallel with independent drive shafts and the output combined through a gearbox. In addition, each actuator is equipped with dual output position sensors. FIG. 5a shows an conventional architecture for a single shaft implementation with motors 502 having position sensors 503, an optional brake 504, reduction gearing 505, and, output shaft position sensors 501. FIG. 5b shows a very similar implementation, but with the motors driving separate shafts, joined to a common output shaft through a reduction gearbox.

Figure 6:
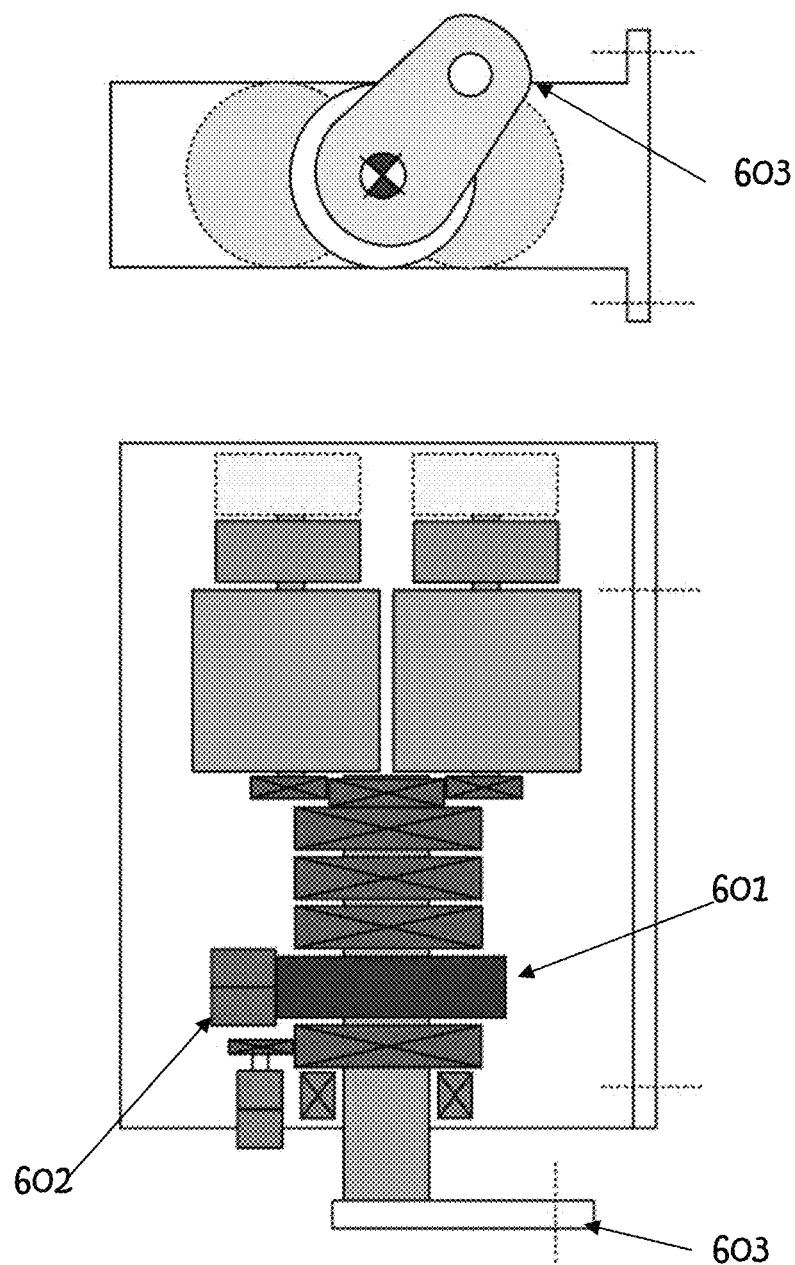
FIG. 6 is a schematic of an electromagnetic actuator with parallel drive motors and redundant position monitoring, according to an embodiment.

In a related invention, FIG. 6 shows an alternate configuration which addresses the risk of jamming on a rotary actuator. In this implementation, a rotary solution to jamming in the gearbox, ballscrew, or other mechanical feature of the actuator, is to add a clutch/disconnect 601 type element at the output of the actuator, downstream of all geared elements. In an exemplary embodiment, this clutch is electrically actuated via solenoids 602 to disconnect the output crank from geartrain and is commanded to engage or disengage by the actuator controller. Further, this embodiment is protected against an accidental disconnect through use of a partner control channel.

Figure 7:
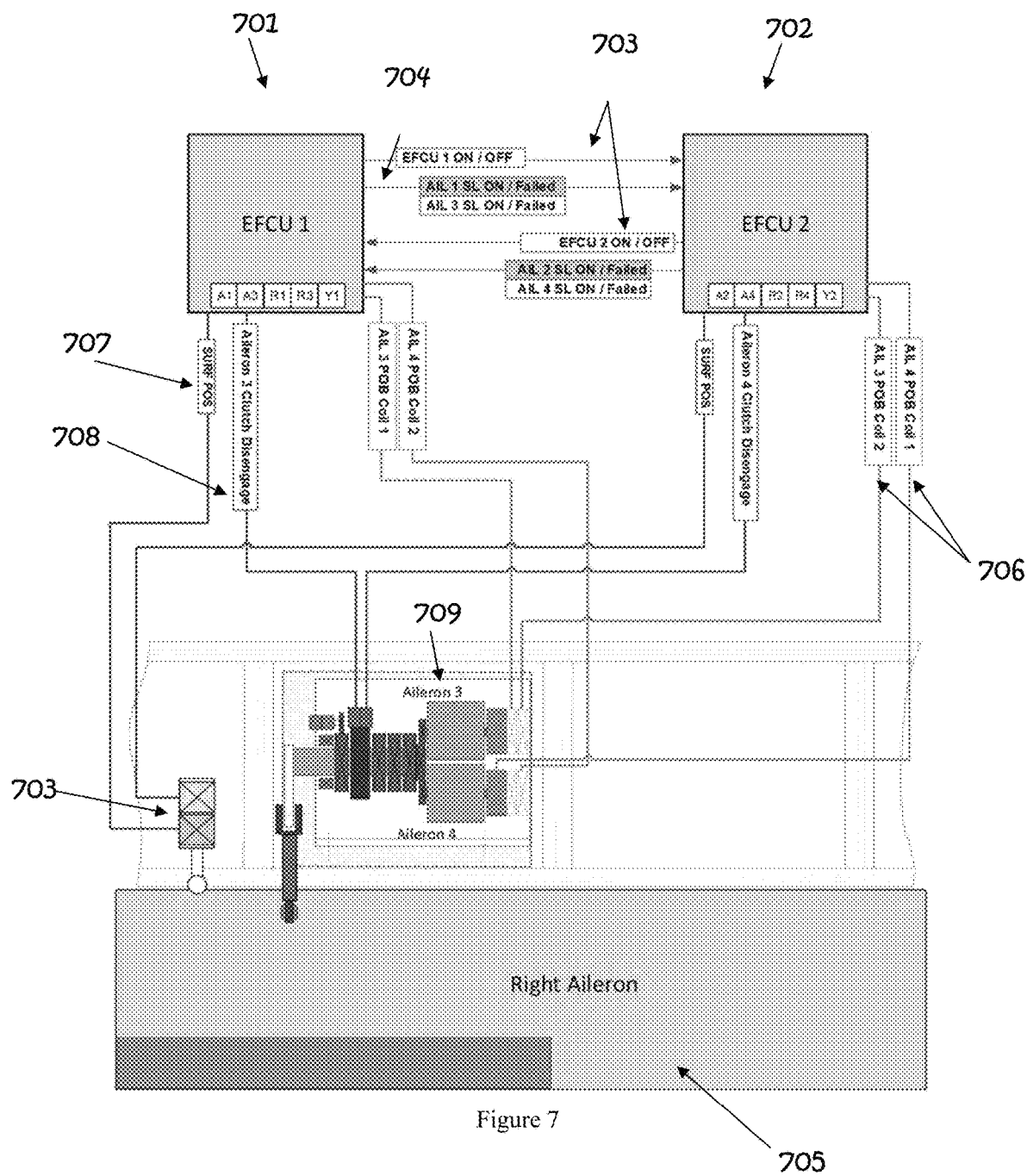
FIG. 7 is a schematic of a dual channel flight control system, according to an embodiment.

A flight control system as depicted in FIG. 7 consisting of two or more independent Electronic Flight Control Units (EFCU), 701, 702, each connected to the actuator 709 previously depicted in FIG. 6 and with all attachments thereof, and independent position sensors 703 on the control surface 705, in this case the Right Aileron. In this embodiment, the communication channels between EFCUs are depicted 703 and 704, as well as some, but not all of the communication channels with the actuator and position, 706, 707, and 708. Note the fully independent channels to each EFUC, for example from the position indicator 703 In this embodiment, the connection of the EFCU to the actuator motor is referred to as a servoloop, and each EFCU is considered to be "a channel", however servoloop communications (wires) between EFUCs and Actuator are not shown for clarify.

The FCS is configured such that at any one time, one of the EFCUs is primary, and the second EFCU is secondary.

Further, the FCS is configured such that each channel has the capability to disconnect the actuator from the load shaft via the clutch, and further that each channel provides two (2) pieces of information to the other EFCU:
- a) The health of the EFCU, which may refer to a single card inside a more extensive computer, or an entire control box. This health may be simply presented as a binary function of availability; the EFCU is either available (on), or no (off).
- b) The health of the servoloop where the state of the circuit is either "active" or "failed"
- c) One event, but by no means the only event, which would return a "failed" status on the servoloop is a mismatch between commanded position and measured position.

It is an important feature of this invention that when configured in the manner disclosed here, the system is able to differentiate between a failed controller (EFCU), a failed monitor (position indicator), and a failed actuator, an from there to activate, or ignore, the clutch accordingly.

Figure 8:
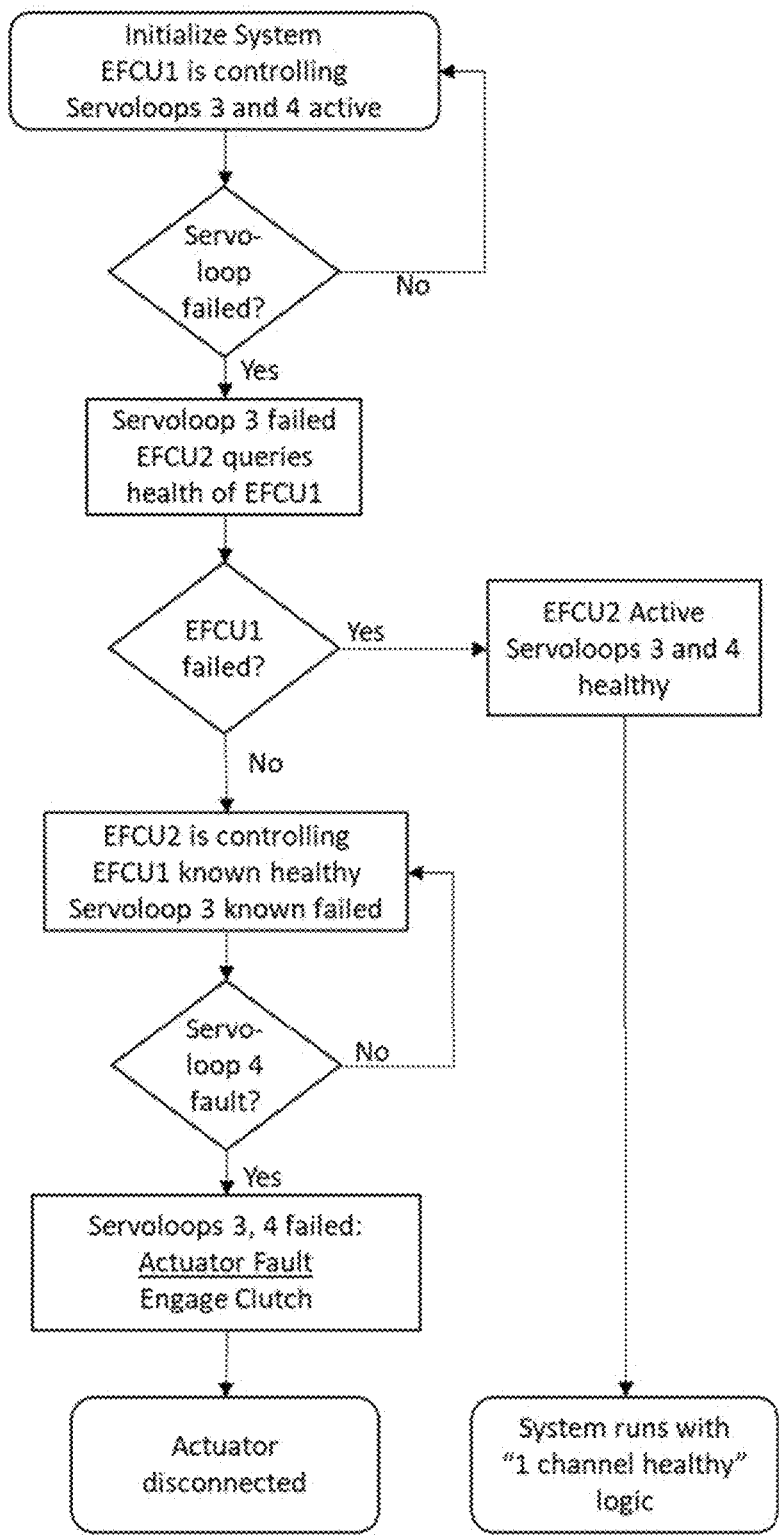
FIG. 8, is a flowchart or flow diagram illustrating a process, method, operation, or function to determine whether an electromagnetic actuator is jammed or otherwise incorrectly responding to valid commands, according to an embodiment.
Figure 9:
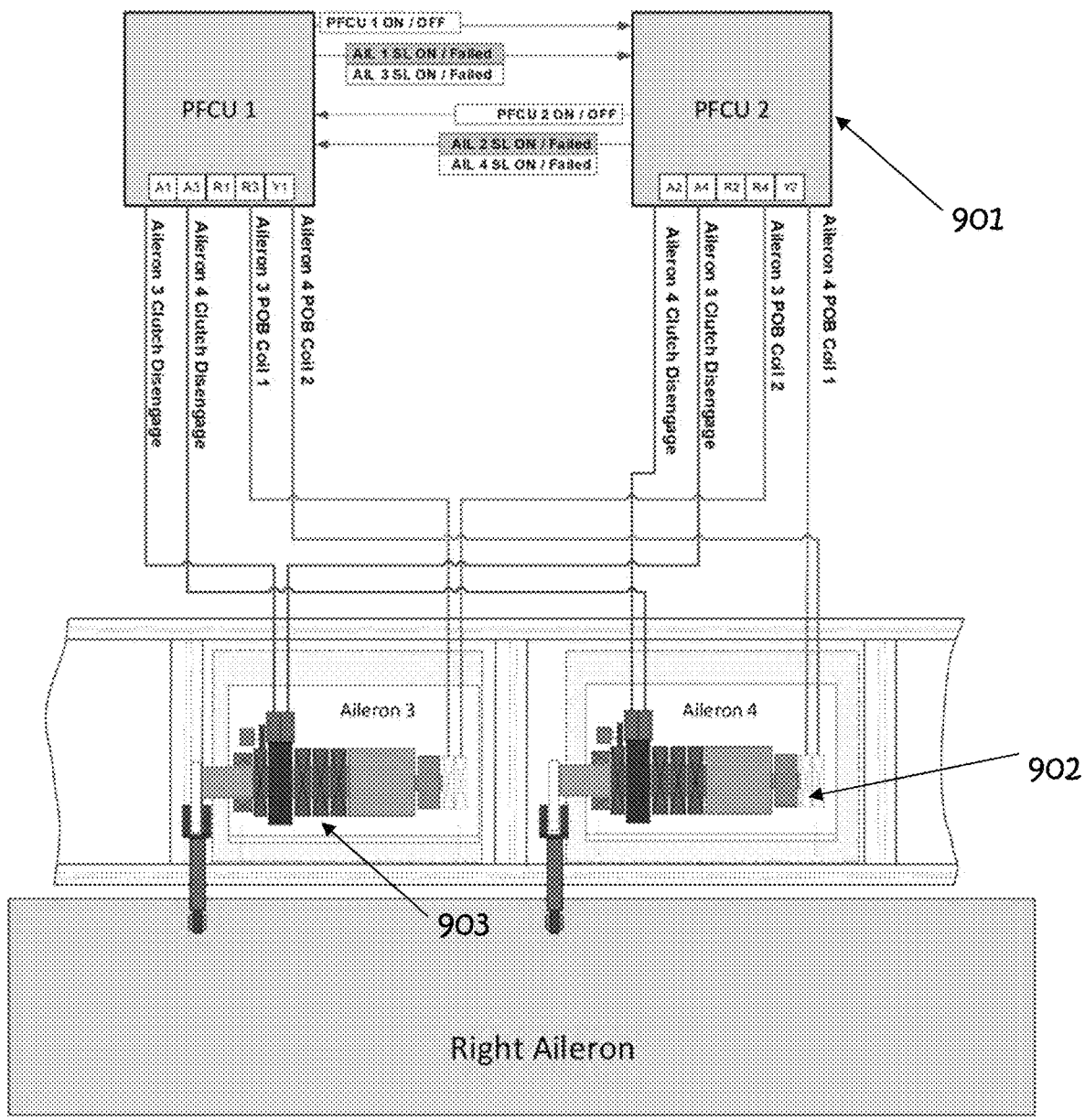
FIG. 9 is a schematic of a flight control system in which multiple actuators are attached to the same control surface, according to an embodiment.

In this implementation, the logic to identify a mechanical jam would follow a sequence of events and logical responses as depicted in the flowchart in FIG. 8. A narrative of the flowchart is provided here and the labels refer to those shown in FIG. 7.
- a) Channel 1, the primary EFCU fails due to sensing a position error in the servoloop which may be sensed as a mismatch between commanded and actual position. At this point in time, the system does not have sufficient information to determine if the failure is in the servoloop or the channel: AIL 3 servoloop (SL) failed
- b) Channel 2 checks the health of Channel 1 and finds the channel healthy, the failure is in the servoloop leading to a "no Disconnect" logic (EFCU 1 ON and AIL 3 SL failed, EFCU 2 ON and AIL 4 SL active)
- c) Channel control switches to Channel 2 (EFCU 2)
- d) EFCU 2 also fails due to position error
- e) The logic check now shows Channel 1 failed, but EFCU 1 indicates healthy, Channel 2 failed, EFCU 2 indicates healthy.
- f) Based on these 3 elements (EFCU 1 ON AND AIL 3 SL failed AND AIL 4 SL failed), the system logic determines the failure to be in the servoloop and that the actuator should be disconnected from the load shaft by clutch. EFCU 2 commands the clutch, via solenoid or other means, to disengage from the load shaft allowing the surface to free float, or continue to function if there at least one additional actuator attached to the control surface.

A second failure mode of the actuator is the "runaway" in which the actuator moves without command; such a runaway would also immediately be flagged as a servoloop failure by the active channel controller (mismatch between commanded and reported position), triggering the same logic as disclosed for a jam, which will again result in actuation of the clutch to disconnect the runaway actuator.

In a further implementation, an electronically controlled brake is implemented on the load shaft, 504 in FIGS. 5a and 5b. The system could then hold the jammed actuator at a known position, such as neutral after the failure.

The previously described embodiment enables use of EMAs in an otherwise conventional FBW system wherein a single actuator is connected to the control surface, and a failure resulted in loss of use of the control surface. In another embodiment, this architecture is extended with a second actuator connected to the same control surface and same EFCUs in such a way that the surface continues to function within limits of the remaining actuator after failure of the first actuator. As recognized by the inventor, the key elements to providing this capability, in addition to the already disclosed architecture are:
- a) Dual position sensors on the flight control surface as well as the actuators
- b) Dual channel electric clutches on each actuator configured such that each clutch is controlled by a separate channel
- c) Said clutches are configured to disengage when powered by the control channel and that both channels must de-energize in order to engage the clutch (disconnecting the drive shaft from the actuator shaft)
- d) Further, that each actuator may be provisioned with a similarly configured dual-coil power-off brake such that both channels must be de-energized to engage the brake.

An exemplary implementation of the innovation is depicted in FIG. 8 in which two control channels are configured as previously disclosed, and are connected by servoloop to two actuators driving a common flight surface, and in which both actuators include dual channel electric clutches as described in the preceding paragraph. In this implementation it can be shown that the following states of operation are enabled, and the system reaches the full functionality of a conventional, hydraulically actuated FBW system:
- f) Full System Operational: Both Actuators Active (Active-Active Arch) or One Active and one bypassed (Active-Standby)-Architectural Decision (there are some differences regarding failure management);
- g) One System Failed: Failed Actuator is bypassed (servoloop off) and can be backdriven and one Actuator controls the surface;
- h) Both Systems Failed, no brake: Both Actuators are bypassed (servoloop off), Surface free floats;
- i) One System Failed, Jammed Output: Failed Actuator is bypassed (servoloop off), but structurally jammed. Actuator control unit energizes electric clutch to disengage, allowing actuator output to move freely. Active actuator operates normally to control surface with minimal resistance;
- j) Both Systems Failed, with brake: Both Actuators are bypassed (servoloop off), but also locked by de-energizing the power off brake; surface is in fixed position.

As previously recognized by the inventors and disclosed in U.S. Pat. No. 9,561,860 B2, an important, enabling feature of the aircraft is to be able to quickly remove and replace energy storage units, such as battery packs. As further recognized by the inventors here, there are significant advantages to configuring individual battery packs into structurally independent "Pod". The methods and apparatus developed to meet these requirements were previously disclosed in U.S. Provisional Patent Application No. 62/772,455.

For point of clarification, energy storage units (ESUs), for example battery packs, are defined as a single physical container in which there are one or more modules, each of which contains one or more cells. Each ESU has connections for electrical power, data, and possibly coolant connections which interface with the Pod. These connection points may be automatic or manual connect and disconnect, including 'blind' connection points.

As is well known to those familiar with the art, quickly removing and replacing heavy, bulky ESUs or ESU Pods is substantially more challenging than transfer of a liquid fuel into a standard wing or fuselage fuel tank. The Pod needs to be on the outside of the aircraft for quick access, yet streamlined, and structurally efficient to minimize adverse performance impact. This disclosure will provide a number of examples in how to integrate quick-swap capable pods with low impact on the aircraft including:

A configuration in which there are fixed, aerodynamically faired pods on the wings containing one or more ESUs. In one implementation, the ESUs are removed separately, for example by hinging the front of the pod to swing up allowing direct ESU access, and in another implementation, the portion of the Pod containing ESUs is removed from the aircraft entirely.

Figure 11:
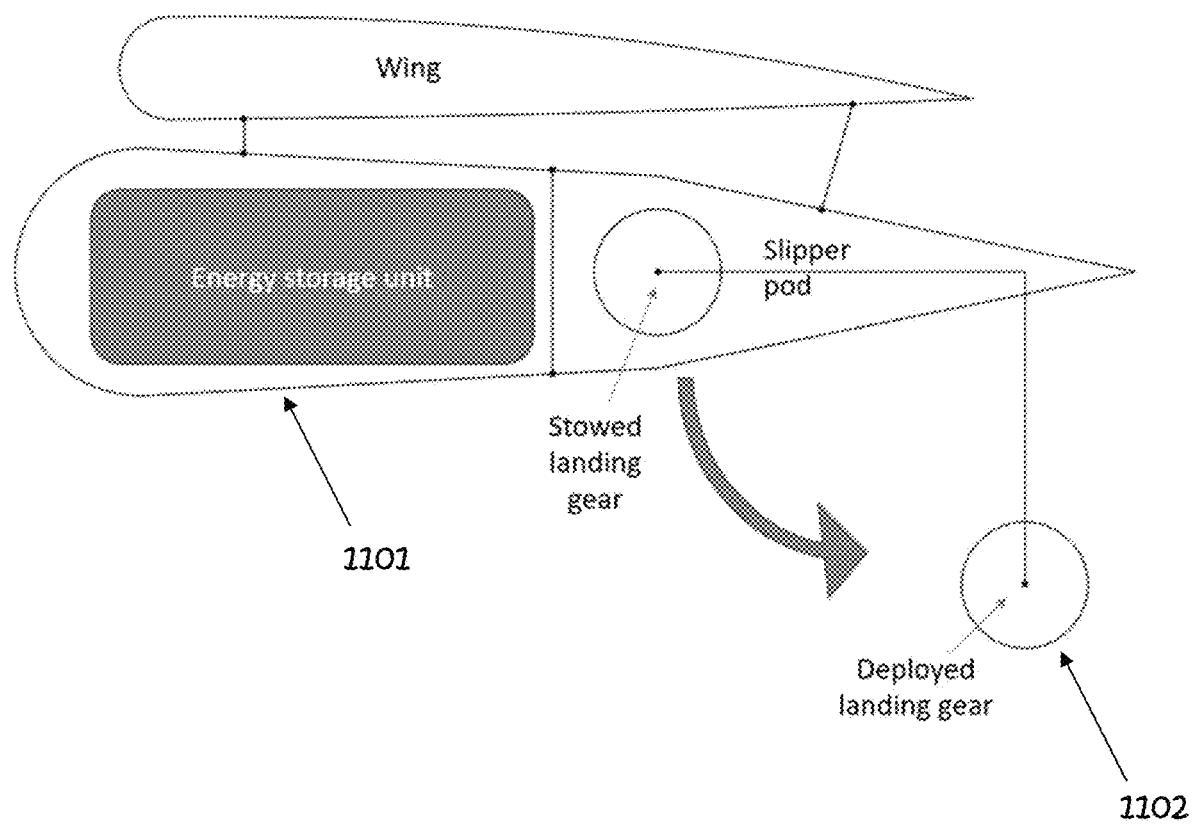
FIG. 11 depicts a wing mounted pod in which landing gear and one or more energy storage pods are integrated, according to an embodiment.

A second configuration as depicted in FIG. 11 which utilizes the wing pods 1101 of the configuration in the preceding paragraph, and in which is also integrated the main landing gear 1102.

Figure 12:
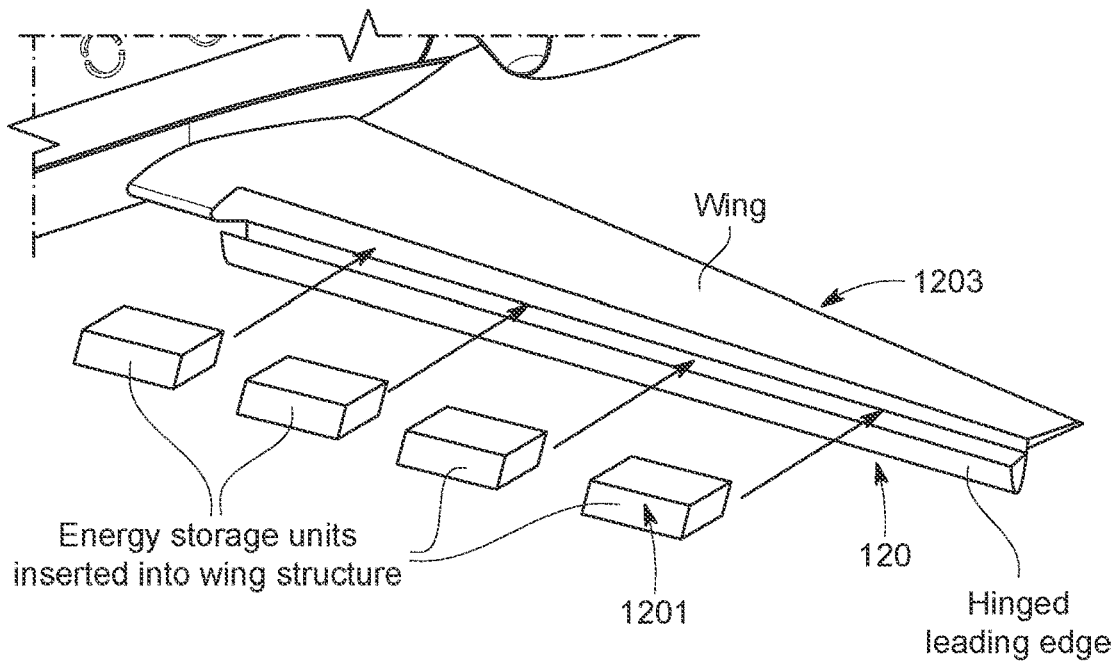
FIG. 12 is a diagram illustrating a wing in which removable energy storage units are located ahead of the main spar and accessed through a hinged leading edge, according to an embodiment.

A configuration in which one or more ESUs located in the wing ahead of the front spar forming the leading edge of the wing as depicted in FIG. 12. This location is typically empty space and provides structural relief for static loads and flutter to offset the weight of the installation hardware. Access to ESUs, 1201 may be through A hinged leading edge, 1202, shown here in the 'open' position, and as previously disclosed in U.S. Provisional Patent Application No. 62/772,455.

Figure 13:
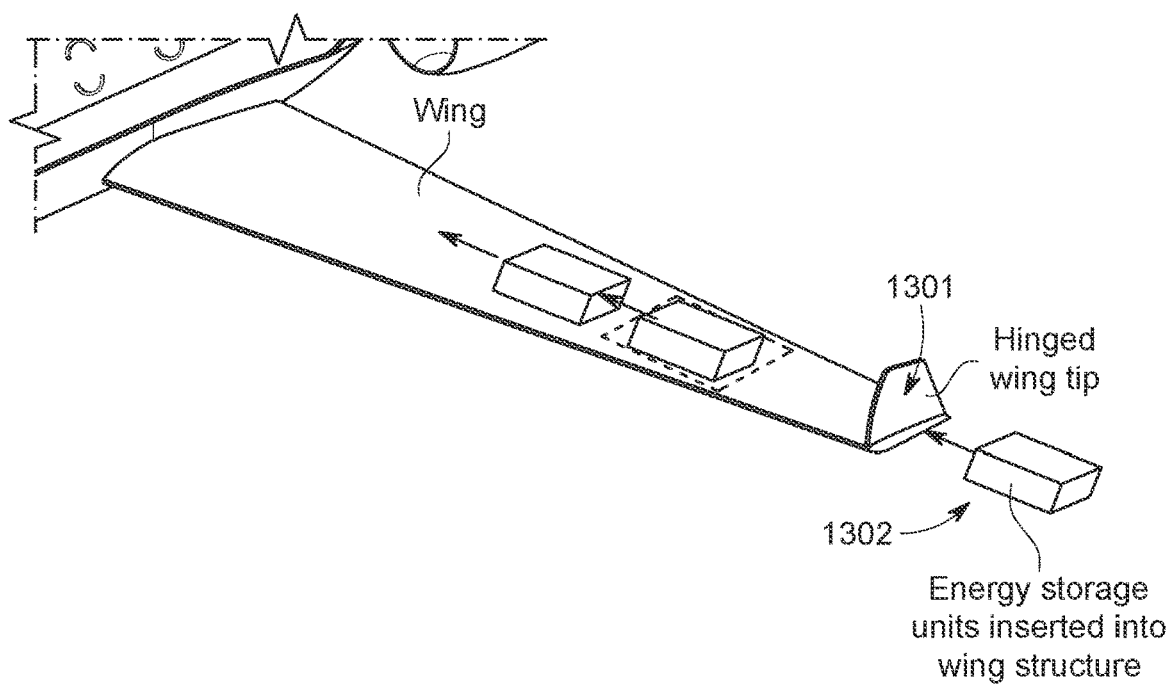
FIG. 13 is a diagram depicting a method for removing and installing energy storage units into a wing through a folding tip, according to an embodiment.

A configuration in which the ESUs are integrated directly into the primary wing box (between front and aft spars) and depicted in FIG. 13 in which access to this space is by hinging the wing tip 1301, which folds out of the way for ESU 1302 loading and unloading.

A configuration in which ESUs are integrated into the primary wing box and access is via an opening in the lower wing skin. Energy storage unit(s) are raised into the wing via cutouts in the skin as depicted.

Figure 14:
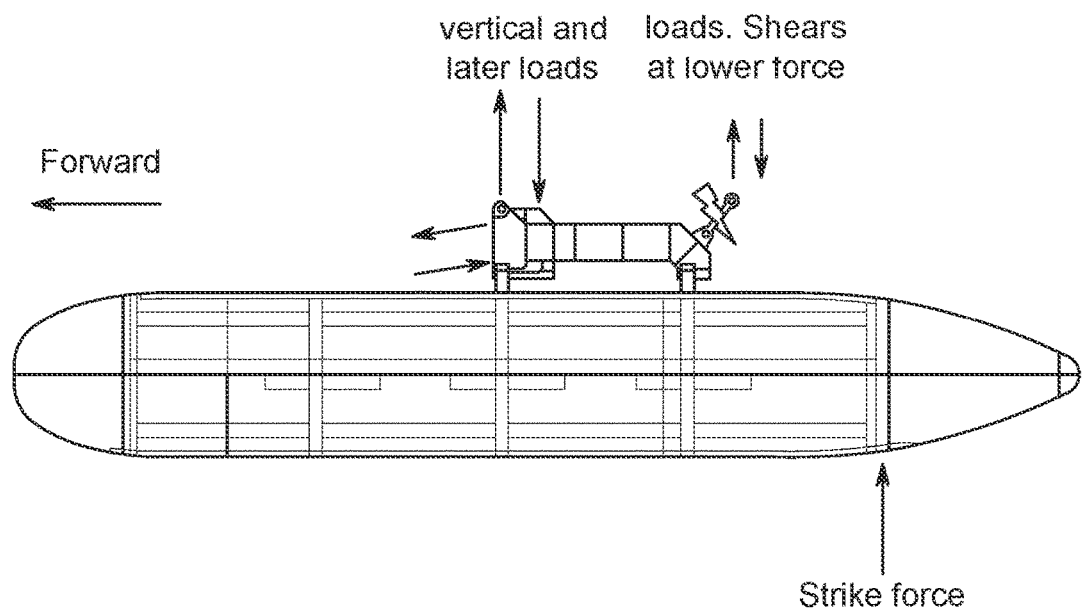
FIG. 14 is a diagram showing an external pod attach mechanism which enables break-away in case of an accident, according to an embodiment.

A configuration in which one or more energy storage unit(s) are contained within a pod which is attached to the under side of the wing with a pylon, which is equipped with one or more break-away connections to ensure that the pod separates from the wing in an event of a wheels up or crash landing. This safety feature prevents the pod from being trapped under the aircraft where it could be hazardous due to post-crash ESU rupture and fire. An exemplary implementation of a breakaway pylon mounting as depicted in FIG. 14 is through the use of two shear pins which connect the pylon to the wing at points one behind the other, for example the front and rear spars. The front shear pins transfer the horizontal, vertical and lateral loads to the wing. The aft shear pin transfers vertical loads only. At a positive angle of attack the aft end of the pod containing the energy storage unit will strike the ground first, breaking the aft shear pin under this vertical load. After the aft link shears off a leveraged moment is induced in the forward link via a pivot point just aft of the forward link. The rotation stopper forces the forward pin to shear with rotation and fully release the pod.

Figure 15:
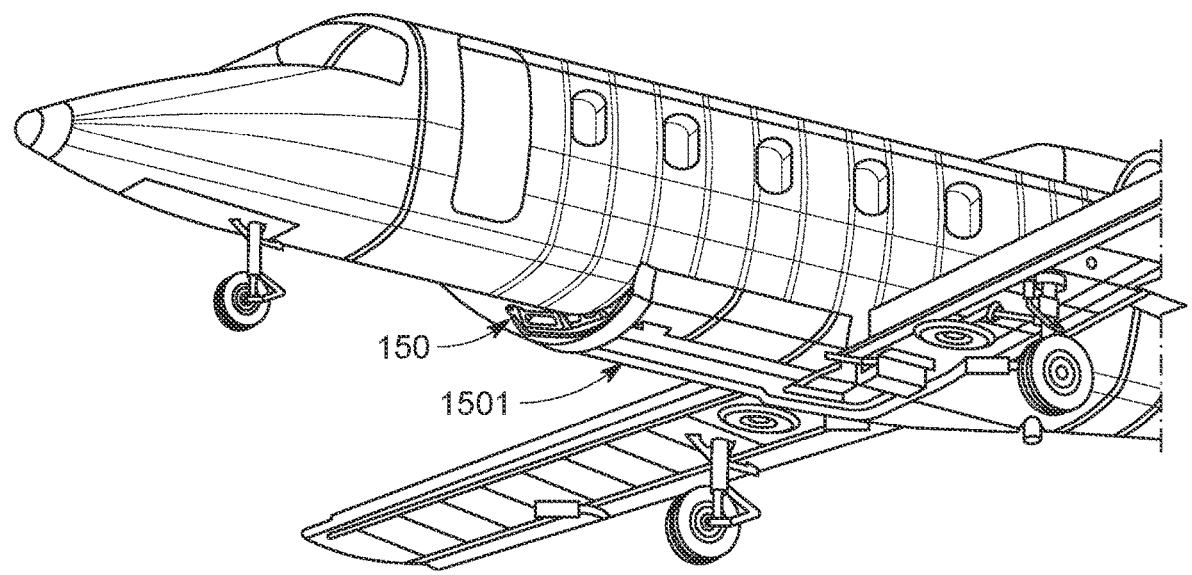
FIG. 15 is a diagram of energy storage units integrated into the wing-body fairing of an aircraft, according to an embodiment.

A configuration in which one or more energy storage unit(s) are located in a pod or pods which form an integral part of the wing-body fairing as depicted in FIG. 15 and previously disclosed in U.S. Provisional Patent Application No. 62/772,455. In this configuration, the entire wing-body fairing element 1502 forming the Pod is removed and replaced as part of the ESU 1502 swap process. Once installed, the gap between the Pod and the aircraft is sealed for aerodynamic smoothness; such a seal might include passive elements, for example rubber wipers, brushes, and active elements, such as an inflatable gasket.

A configuration in which one or more energy storage unit(s) located in discrete bays in the wing-body fairing as described in the preceding paragraph, but which are not structurally joined into a pod. In this implementation, the energy storage unit(s) are removed through an access panel in the side of the wing body fairing. ESUs may be discrete or pre-joined on a rack for insertion and removal from the aircraft. In this implementation, the ESUs may have quick-connect fittings between packs for electrical and cooling connections as further described in U.S. Provisional Patent Application No. 62/772,455. In an exemplary implementation of this innovation, two or more ESUs are integrated together on a rack which is inserted and removed through a hatch in the front of the wing body fairing.

An implementation of the configuration described in the preceding paragraph in which One or more energy storage unit(s) are attached to, and accessed from a hinged drop shelf integrated into the aircraft fuselage or wing-body fairing via a four-bar linkage.

Figure 10:
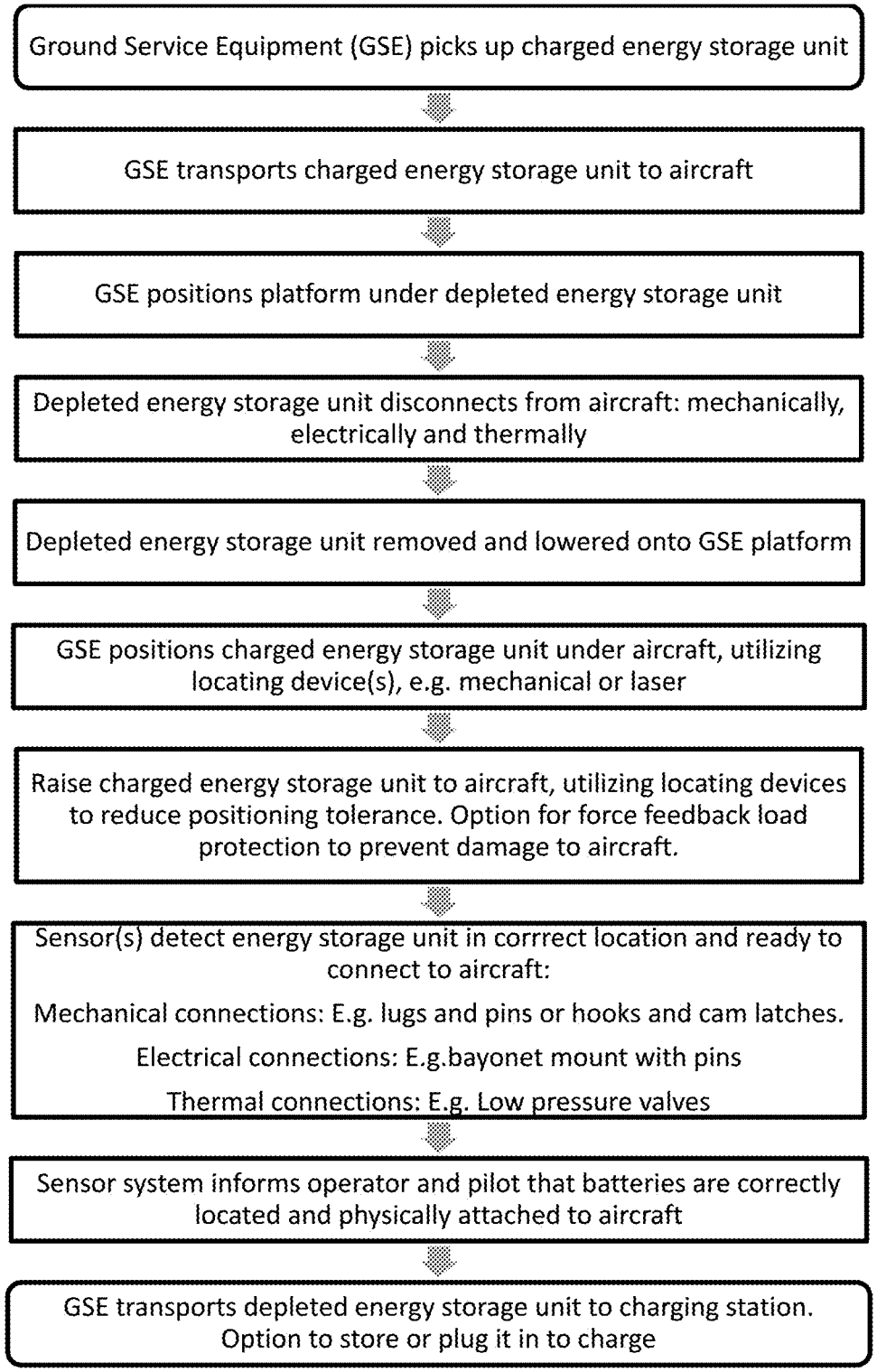
FIG. 10 is a flowchart or flow diagram illustrating a process, method, operation showing the necessary steps for quick-swap of energy storage units, according to an embodiment.

As recognized by the inventors, there are a number of elements required to enable a full quick-swap operation, a system and method for which is depicted in the flow chart shown in FIG. 10. In some implementations, the energy storage unit or containing pod will contain a robust system to locate and physically, electrically and thermally, connect and disconnect to the aircraft. This system is comprised of an array of one or more of the following: locating device(s), locking mechanism(s), electrical connection(s), pneumatic connection(s), liquid connection(s) an array or one or more sensors and/or a display system. that informs the operator and/or the flight crew of the status of the energy storage unit and containing pods' physical connection to the aircraft.

In this implementation, the quick swap process starts with the depleted energy storage unit or containing pod which is mechanically, electrically and thermally separated and removed from the aircraft. The charged energy storage system and containing pod is located by an array of one or more location features, e.g. mechanical, such as tapered pins, or electronic, such as laser locating sensors. As the energy storage unit and containing pod is raised into position the tolerance of the location of the module will reduce until the sensors detect it is positioned to the tolerance required to connect to the aircraft. The load cell may be provisioned for force feedback such that if the module is being incorrectly loaded, it will reduce the load so there is no damage to the aircraft. An array of one or more locking/unlocking mechanisms, such as lugs and pins or D-hooks and cam latches will secure the battery module to the aircraft. The battery pod will electrically connect to the aircraft electric system via a feature such as a bayonet mount consisting of a number of pins. The sensor and/or display system will inform the operator of the status of the operation, and alert them to any failures to mechanically or electrically connect to the aircraft.

Figure 16:
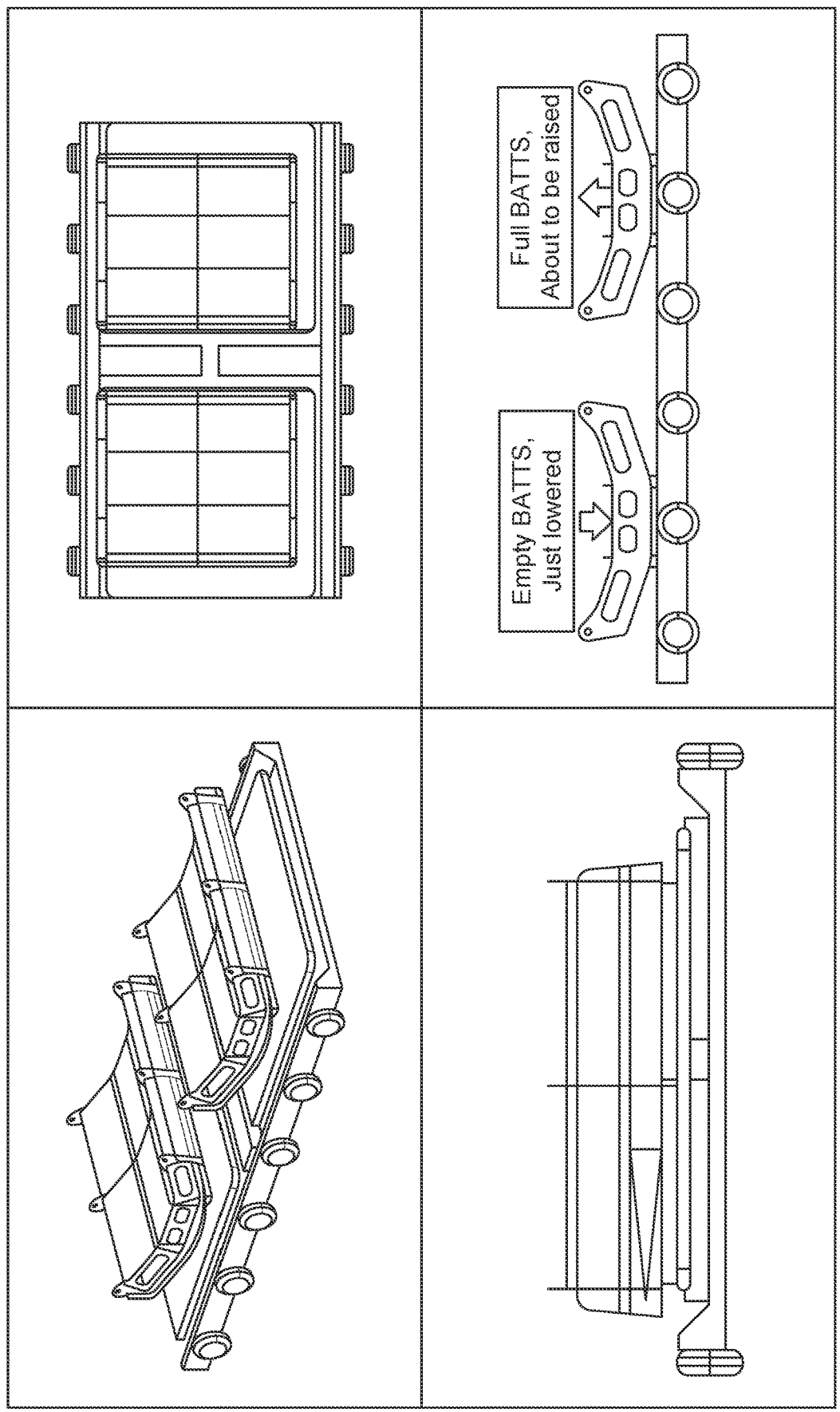
FIG. 16 is a diagram illustrating a ground service mechanism to facilitate quick swap of battery storage units or pods, according to an embodiment.

As further recognized by the investors, quick swap will be greatly facilitated through the use of purpose designed ground service equipment; an exemplary implementation of such a ground support vehicle (GSV) which is capable of executing the steps defined by FIG. 10, with one example of how such a vehicle could be configured in FIG. 16, and previously disclosed in more detail in U.S. Provisional Patent Application No. 62/772,455. This GSV would be capable of the following operations in sequence: retrieving a battery pod from a different location on the airport, transporting the pod to the aircraft, maneuvering under the current pod, removing the current pod from the aircraft, replacing with the pod from the airport, and then delivering the pod removed from the aircraft to another location, such as the charging infrastructure at the airport or for transportation to another site.

In one implementation, the GSV further has a provision to physically connect the aircraft to the ground service equipment in such a way as to prevent the aircraft from tipping backward when the weight of the batteries is removed. In this implementation, the GSV physical restraint eliminates the need for a tail stand.

Figure 17A:
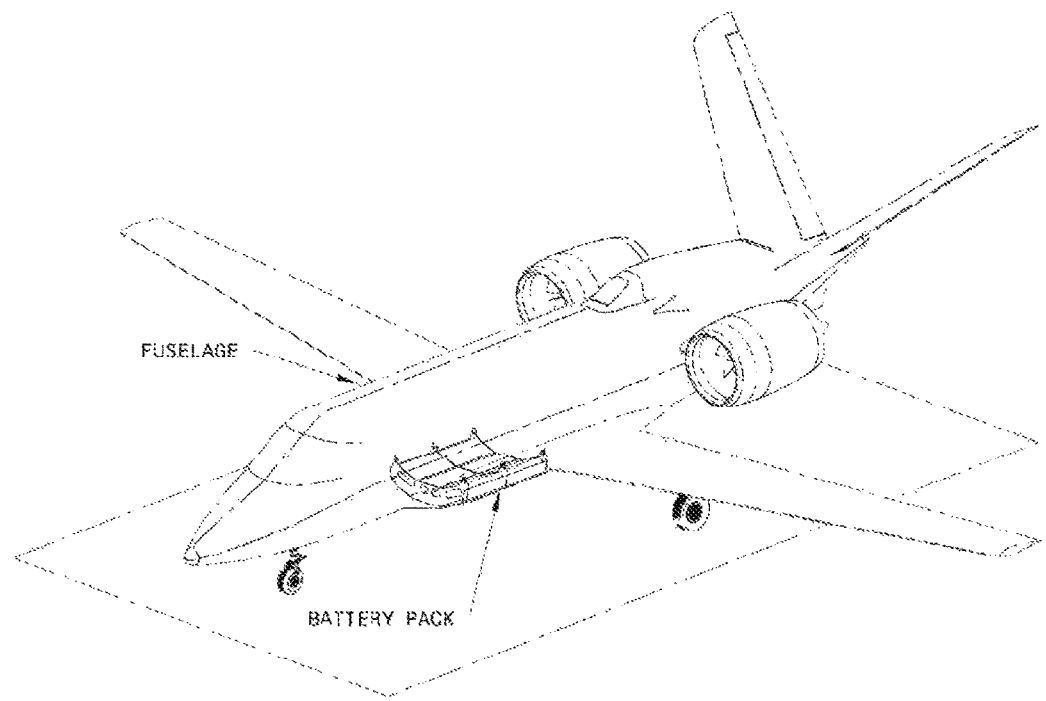
Figure 17B:
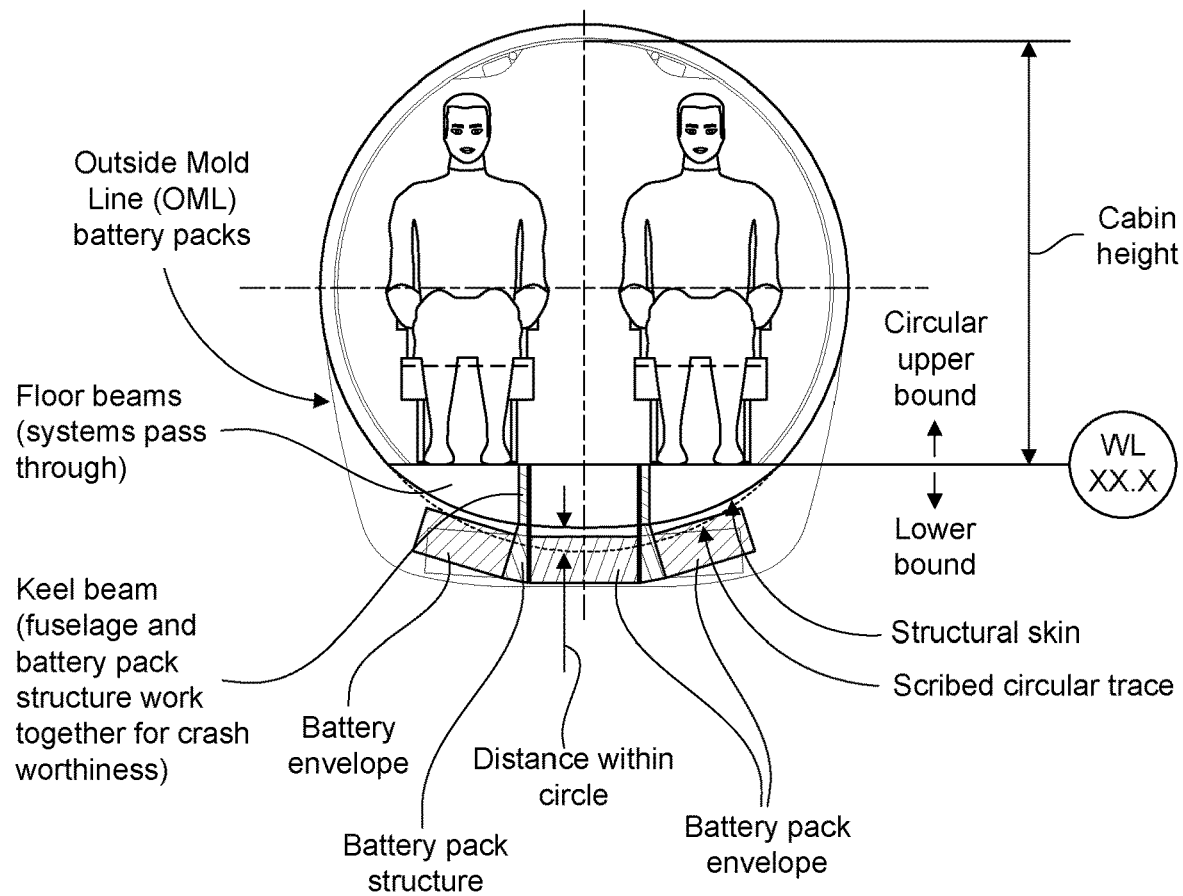
FIG. 17b is a diagram illustrating an optimized fuselage cross section with integrated energy storage units, according to an embodiment.

In addition to the direct requirements for constructing and attaching ESU Pods to the aircraft, the Electric or hybrid-electric aircraft have unique requirements to maximize cabin and battery volumes while minimizing weight and drag. In one exemplary implementation of the ESU configuration described in above and depicted in FIGS. 17a and 17b, this results in a passenger cabin as disclosed in U.S. Provisional Patent Application No. 62/772,455 in which the cost optimization function TCD2D also disclosed in U.S. Provisional Patent Application No. 62/772,455 was used to optimize the fuselage cross section. In this implementation, a fuselage is defined by a circular cross section above the floor of the passenger compartment, while the fuselage shape below the floor envelopes the battery packs while smoothly blending into the cylinder. To minimize the wetted area and forward projected area of the fuselage, the structural skin of the fuselage passes inside a circle scribed by the upper outer mold line of cabin, above the battery.

In another example of innovations disclosed regarding systems and methods to support hybrid-electric aircraft, the integration of a gas turbine for power generation is addressed. In particular, while most aspects of mounting either a primary or auxiliary gas turbine on an aircraft are well understood by those familiar with the art, there are some novel aspects when a primary propulsion turbine is integrated in a fashion more similar to an auxiliary power unit (APU) in the upper aft end of the fuselage. However, much more so than an APU, the propulsion turbine requires a high quantity of intake air, free of particles or ice which would damage the turbine. This integration results in the need to have an inlet particle separator (IPS) above the centerline of the engine, not below as is typically done. An implementation of such an IPS was disclosed in U.S. Provisional Patent Application No. 62/772,455.

An additional novel aspect of gas turbine generator integration is the need to close the turbogenerator inlet when the aircraft is functioning on batteries alone. In one implementation, also disclosed in U.S. Provisional Patent Application No. 62/772,455, the inlet includes an actuated surface which serves to close the inlet duct when the generator is not running. In this implementation, the streamlined surface both prevents air from entering the engine and also reduces drag on the aircraft. When the turbine is turned on the surface is repositioned to be located forward of the inlet and aligned with the airflow creating a wall to separate the boundary layer flow from the freestream which increases the smoothness of the air ingested by the turbine In another implementation, the turbogenerator inlet lip is heated to prevent ice accretion during flight as is common for gas turbine inlets. Novel to this installation is the use of waste heat from the electric generator to provide the anti-ice heating, rather than hot air bleed from the compressor of the gas turbine. In this way, there is no efficiency loss to the gas turbine, and the generator waste heat is partially utilized as previously disclosed in U.S. Provisional Patent Application No. 62/772,455.

In another embodiment, a method of aircraft design for minimized consumer total cost door to door (TCD2D), where both time and monetary cost are minimized over the entire trip, is presented. This is a new design metric for aircraft; companies today use operating costs and/or other constraints such as flight time, cargo capacity, etc. to govern their aircraft designs. Total cost to passenger (time and money) is a different and innovative way to guide a design, and for regional commercial operations, perhaps the most important metric. It allows for comparison and improved competitiveness to other travel modes, such as rail and cars. In regional distances (vs long haul flights), there is real competition between these modes and air travel. In order to be as competitive as possible, aircraft must minimize total cost door to door, from a time and money perspective.

As recognized by the inventors, using TCD2D as an objective function leads to non-obvious conclusions about the aircraft design. It can lead to weighing takeoff runway length more heavily than cruise efficiency, for instance. An example is wing area, which needs to be larger to reduce takeoff runway length, but smaller to increase efficiency at high speed cruise. Given this, if an aircraft were to be solely designed for cruise efficiency or direct operating cost, the wing area would be smaller. However, if the design metric is instead the total cost door to door to the passenger, the increase in travel time and money cost to an airport with a longer runway would be weighed against the increase in operating cost during cruise. It may well be that the bigger wing is chosen in this case. This is just one example out of many in which TCD2D may be used to come to a different conclusion in a trade study or design decision for aircraft.

The basic equation for TCD2D is meant to capture the differences between aircraft variants and other travel modes to see how competitive they are at different ranges. The equation is not meant to calculate the real world total cost one would pay for a given trip. The real world of fare calculation, with route competition and other such factors, is more complex. This level of complexity is not needed in order to assess competitiveness of Zunum aircraft or for trades—all that is needed is a way to compare the different aircraft and modes of travel that takes the cost of time and travel into account. The fundamental equation for TCD2D is given by:

$$TCD2D = Fare_{avg} + COT + COGT + COC$$

where

Fareavg is an average calculated fare based on direct operating cost (DOC)

COT is cost of time, door to door including ground travel

COGT is cost of ground travel, which for a car trip is the only travel cost in TCD2D (Fareavg=0). For any air trip there is a cost to travel to and from the airport.

COC is cost of convenience, a variable to express desirability of having your own car with you for the whole trip.

Additional detail on each of these component equations is disclosed in U.S. Provisional Patent Application No. 62/772,455.

What is claimed is:

1. A method comprising:
   transporting, by a ground system vehicle, at least one charged energy storage unit from a first airport location to a stationary, landed aircraft; and
   while the ground system vehicle is aligned with the stationary, landed aircraft and using equipment installed on the ground system vehicle:
      removing at least one depleted energy storage unit from the stationary, landed aircraft, removing the at least one depleted energy storage unit from the stationary, landed aircraft comprising mechanically and/or electrically disconnecting the depleted energy storage unit from an aircraft bay; and
      installing the transported at least one charged energy storage unit on the stationary, landed aircraft to replace the removed at least one depleted energy storage unit by positioning the transported at least one charged energy storage unit while external to the landed aircraft using one or more locating devices to track a location of the transported at least one charged energy storage unit relative to the landed aircraft and, once installed on the landed aircraft, mechanically and/or electrically connecting the transported at least one charged energy storage unit to the aircraft bay.

2. The method of claim 1, and further comprising transporting, by the ground system vehicle, the removed at least one depleted energy storage unit to a second airport location for storage and/or charging.

3. The method of claim 1, wherein the stationary, landed aircraft comprises landing gear that is in contact with ground, and the method further comprises, while removing the depleted energy storage unit or installing the transported at least one charged energy storage unit, securing the stationary, landed aircraft by one or more restraints connected to the ground system vehicle and/or the equipment.

4. The method of claim 3, and wherein at least one of the one or more restraints connected to the ground system vehicle and/or the equipment prevent a backward tipping of the stationary, landed aircraft.

5. The method of claim 1, wherein removal of the at least one depleted energy storage unit and installation of the transported at least one charged energy storage unit comprise detaching or opening at least a portion of an access panel on a fuselage, fuselage fairing or wing of the stationary, landed aircraft, the access panel comprising an exterior surface conforming to a contour of an exterior skin of the stationary, landed aircraft.

6. The method of claim 1, wherein the aircraft bay is disposed within a pod suspended from a wing of the landed aircraft, a fuselage fairing or the wing of the landed aircraft.

7. The method of claim 6, wherein the aircraft bay is accessible via an access panel comprises a hinged wing tip or a front spar forming a leading edge of the wing of the landed aircraft.

8. The method of claim 1, and wherein installing the transported at least one charged energy storage unit comprises:
   while raising the transported at least one charged energy storage unit from the ground system vehicle to the landed aircraft;
   reducing a tolerance of a location of the at least one charged energy storage unit until sensors detect that the at least one charged energy storage unit is positioned to a tolerance sufficient to connect the at least one charged energy storage unit to the landed aircraft; and
   selectively reducing a load responsive to a force feedback if the at least one charged energy storage unit is being incorrectly loaded.

9. The method of claim 1, and wherein installing the transported at least one charged energy storage unit comprises:
   moving the transported at least one charged energy storage unit relative to the landed aircraft to reduce a tolerance of a location of the transported at least one charged energy storage unit until detecting, through use of at least one of the one or more locating devices, whether the transported at least one charged energy storage unit is in a correct position sufficient to be mechanically and electrically connected to the aircraft based, at least in part, on sensor signals.

10. The method of claim 1, and further comprising providing an indication of status of electrical and mechanical connections responsive to completion of installation of the transported at least one charged energy storage unit.

11. The method of claim 1, wherein:
    mechanically disconnecting the depleted energy storage unit comprises disconnecting one or more coolant connections; and
    mechanically connecting the transported at least one charged energy storage unit comprises connecting the one or more coolant connections.

12. The method of claim 1, wherein installing the transported at least one charged energy storage unit on the stationary, landed aircraft comprises:
    mechanically connecting the transported at least one charged energy storage unit to a bay using lugs, pins, hooks and/or cam latches;
    electrically connecting the transported at least one charged energy storage unit to the bay using a bayonet mount with pins; and
    thermally connecting the transported at least one charged energy storage unit using low pressure valves.

13. The method of claim 1, wherein:
    removing the depleted energy storage unit from the stationary, landed aircraft comprises detaching a first pod from being suspended from a wing of the landed aircraft, the first pod containing the at least one depleted energy storage unit; and
    installing the transported at least one charged energy storage unit on the stationary, landed aircraft comprises attaching a second pod to be suspended from the wing of the landed aircraft, the second pod containing the transported at least one charged energy storage unit.

14. An apparatus comprising:
    equipment configured to be installed on a ground system vehicle, the equipment being further configured to:
    maintain an alignment with respect to a stationary, landed aircraft;
    remove at least one depleted energy storage unit from a bay on the stationary, landed aircraft, removal of the at least one depleted energy storage unit to comprise mechanical and/or electrical disconnection of the depleted energy storage unit from the bay; and
    install at least one charged energy storage unit to the bay on the stationary, landed aircraft to replace the removed at least one depleted energy storage unit, installation of the at least one charged energy storage unit to comprise mechanical and/or electrical connection of the at least one charged energy storage unit to the bay,
    wherein the equipment further comprises one or more locating devices to track a location of the at least one charged energy storage unit relative to the landed aircraft and to position the at least one charged energy storage unit for mechanical and/or electrical connection of the at least one charged energy storage unit to the bay for installation.

15. The apparatus of claim 14, wherein the depleted energy storage unit is removed from an equipment bay accessible through an access panel.

16. The apparatus of claim 15, wherein the equipment bay is disposed within a pod suspended from a wing of the landed aircraft, a fuselage fairing or the wing of the landed aircraft.

17. The apparatus of claim 15, wherein the access panel comprises a hinged wing tip or a front spar forming a leading edge of a wing of the landed aircraft.

18. The apparatus of claim 14, wherein the ground system vehicle is capable of operating without a human operator.

19. The apparatus of claim 14, wherein:
the ground system vehicle further comprises a first bay for securing the depleted energy storage unit and a second bay for securing the at least one charged energy storage unit; and
the equipment is further configured to:
lower the depleted energy storage unit to be secured in the first bay while the at least one charged energy storage unit is secured in the second bay; and
raise the at least one charged energy storage unit from the second bay to be installed in the stationary, landed aircraft while the depleted energy storage unit is secured in the first bay.

\* \* \* \* \*